US012563352B2

(12) United States Patent
Oplinger et al.

(10) Patent No.: US 12,563,352 B2
(45) Date of Patent: Feb. 24, 2026

(54) ADVANCED ASSISTANCE FOR PROSTHESIS ASSISTED COMMUNICATION

(71) Applicant: Cochlear Limited, Macquarie University (AU)

(72) Inventors: Kenneth Oplinger, Macquarie University (AU); Rowan Christopher Page, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 521 days.

(21) Appl. No.: 17/878,029

(22) Filed: Jul. 31, 2022

(65) Prior Publication Data

US 2022/0369050 A1 Nov. 17, 2022

Related U.S. Application Data

(63) Continuation of application No. 16/758,539, filed as application No. PCT/IB2018/058217 on Oct. 22, 2018, now Pat. No. 11,405,733.

(60) Provisional application No. 62/575,567, filed on Oct. 23, 2017.

(51) Int. Cl.
*H04R 25/00* (2006.01)

(52) U.S. Cl.
CPC ....... *H04R 25/554* (2013.01); *H04R 2225/43* (2013.01); *H04R 2225/67* (2013.01)

(58) Field of Classification Search
CPC .............. H04R 25/554; H04R 2225/43; H04R 2225/67; H04R 25/558; H04R 25/505; H04R 25/70
See application file for complete search history.

(56) References Cited

U.S. PATENT DOCUMENTS

| | | | | |
|---|---|---|---|---|
| 6,816,600 | B1 | 11/2004 | Jakob et al. | |
| 7,639,828 | B2 | 12/2009 | Platz | |
| 8,165,329 | B2 * | 4/2012 | Bisgaard | H04R 25/70 381/314 |
| 9,510,112 | B2 | 11/2016 | Petersen et al. | |
| 9,615,179 | B2 * | 4/2017 | Greenberger | H04R 25/405 |
| 9,883,297 | B2 * | 1/2018 | Ungstrup | H04W 4/80 |
| 2006/0204024 | A1 | 9/2006 | Eicher | |
| 2008/0144867 | A1 * | 6/2008 | Schulz | H04R 25/70 381/314 |
| 2011/0144749 | A1 | 6/2011 | Kim, I et al. | |

(Continued)

FOREIGN PATENT DOCUMENTS

| | | | |
|---|---|---|---|
| CA | 2911612 | A1 | 10/2013 |
| CN | 105072552 | A | 11/2015 |

(Continued)

OTHER PUBLICATIONS

International Search Report and Written Opinion for PCT/IB2018/058217, mailed Mar. 13, 2019.

(Continued)

*Primary Examiner* — Brian Ensey
(74) *Attorney, Agent, or Firm* — Pilloff Passino & Cosenza LLP; Martin J. Cosenza

(57) ABSTRACT

A system, including a signal input, a processor a signal output, wherein the processor is configured to generate an instruction related to data related to a recipient of a sensory prosthesis based on input into the signal input, and the signal output is configured to output data indicative of the instruction.

30 Claims, 15 Drawing Sheets

(56) References Cited

U.S. PATENT DOCUMENTS

| | | | | |
|---|---|---|---|---|
| 2013/0243227 | A1 | 9/2013 | Kinsbergen et al. | |
| 2015/0119635 | A1 | 4/2015 | Gustafsson et al. | |
| 2016/0089542 | A1 | 3/2016 | Frieding et al. | |
| 2016/0144178 | A1* | 5/2016 | Hillbratt | A61N 1/36038 607/57 |
| 2016/0241975 | A1 | 8/2016 | Jensen et al. | |
| 2017/0001008 | A1 | 1/2017 | Hunt et al. | |
| 2017/0043161 | A1 | 2/2017 | Meskens | |
| 2017/0064470 | A1 | 3/2017 | Popovac et al. | |
| 2017/0143962 | A1 | 5/2017 | Mishra | |
| 2017/0165487 | A1 | 6/2017 | van den Honert | |
| 2017/0311092 | A1* | 10/2017 | Secall | G10L 25/60 |
| 2020/0344560 | A1 | 10/2020 | Oplinger et al. | |

FOREIGN PATENT DOCUMENTS

| | | | |
|---|---|---|---|
| CN | 106797519 | A | 5/2017 |
| CN | 206452547 | U | 8/2017 |
| KR | 20090108373 | A | 10/2009 |
| KR | 101585793 | B1 | 1/2016 |

OTHER PUBLICATIONS

Apple Support, "Use Live Listen with Made for iPhone hearing aids," https://support.apple.com/en-au/HT203990, accessed Apr. 23, 2020.

Luis Perez, "Apple Watch Review Roundup and Thoughts," Apr. 11, 2015.

Office action and Search Report for Chinese Patent Application No. 201880068125.4, dated Jan. 29, 2021.

Partial European search report for European Patent Application No. 18869629.8, mailed Jun. 24, 2021.

Office action and Search Report for Chinese Patent Application No. 201880068125.4, dated Sep. 8, 2021.

* cited by examiner

ADVANCED ASSISTANCE FOR PROSTHESIS ASSISTED COMMUNICATION

CROSS-REFERENCE TO RELATED APPLICATIONS

This application is a Continuation application of U.S. patent application Ser. No. 16/758,539, filed Apr. 23, 2020, which is a National Stage of PCT/IB2018/058217, filed Oct. 22, 2018, which claims priority to U.S. Provisional Application No. 62/575,567, entitled ADVANCED ASSISTANCE FOR PROSTHESIS ASSISTED COMMUNICATION, filed on Oct. 23, 2017, naming Kenneth OPLINGER of Macquarie University, Australia as an inventor, the entire contents of that application being incorporated herein by reference in its entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. One example of a hearing prosthesis is a cochlear implant.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from hearing loss typically receive an acoustic hearing aid. Conventional hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve. Cases of conductive hearing loss typically are treated by means of bone conduction hearing aids. In contrast to conventional hearing aids, these devices use a mechanical actuator that is coupled to the skull bone to apply the amplified sound.

In contrast to hearing aids, which rely primarily on the principles of air conduction, certain types of hearing prostheses commonly referred to as cochlear implants convert a received sound into electrical stimulation. The electrical stimulation is applied to the cochlea, which results in the perception of the received sound.

Many devices, such as medical devices that interface with a recipient, have structural and/or functional features where there is utilitarian value in adjusting such features for an individual recipient. The process by which a device that interfaces with or otherwise is used by the recipient is tailored or customized or otherwise adjusted for the specific needs or specific wants or specific characteristics of the recipient is commonly referred to as fitting. One type of medical device where there is utilitarian value in fitting such to an individual recipient is the above-noted cochlear implant. That said, other types of medical devices, such as other types of hearing prostheses, exist where there is utilitarian value in fitting such to the recipient.

There are other types of medical devices that enhance or otherwise provide sensory stimulation, such as, by way of example only and not by way of limitation, visual prostheses, such as retinal implants. Collectively, these devices (hearing, visional, etc.) will be described herein as sensory prostheses or sensory medical devices. Some embodiments of some such sensory prostheses include one or more sensory stimulation evoking phenomenon capture apparatuses, such as by way of example only and not by way of limitation, a microphone or a camera, etc. It is noted that sensory stimulation evoking phenomenon does not require that the phenomenon evoke the stimulation in all people (the phenomenon exists irrespective of whether it can be, for example, seen by a blind person or heard by a deaf person).

SUMMARY

In accordance with one exemplary embodiment, there is a system, comprising a signal input suite, a processor and a signal output, wherein the processor is configured to generate an instruction related to data related to a recipient of a sensory prosthesis based on input into the signal input, and the signal output is configured to output data indicative of the instruction.

In accordance with another exemplary embodiment, there is a method, comprising capturing sensory input during an interaction between two or more persons, one of which is using a sensory prosthesis to at least enhance a sensory ability, processing the captured sensory input to identify an indication for one or more of the persons in the interaction that enables the person using the sensory prosthesis to have at least one of an enhanced or adequate sense of a future sensory input; and outputting the indication for the one or more of the persons.

In accordance with another exemplary embodiment, there is an assembly, comprising: a device configured to receive input indicative of a captured sensory stimulating phenomenon and provide output regarding the captured sensory stimulating phenomenon that enhances a future sensory input of a person from a future sensory stimulating phenomenon.

In accordance with another exemplary embodiment, there is a device, comprising a prosthesis configured to operate with a remote sensory evoking phenomenon capture device that also includes an indicator, wherein the prosthesis is configured to provide input to the remote device related to a captured sensory stimulation evoking phenomenon captured by the prosthesis and/or the remote device so that the remote device provides an indication related to the phenomenon via the indicator.

In accordance with another exemplary embodiment, there is a portable electronic device, comprising an visual indicator device; and a wireless communication device, wherein the portable electronic device is configured to display instructions in an interactive format, which instructions are to people in visual range of the visual indicator to take actions to enhance future sensory input of a recipient of a sensory prosthesis.

In accordance with another exemplary embodiment, there is a method, comprising engaging, by a hearing impaired person, in a conversation, utilizing a first electronics device to capture at least a portion of the sound of the conversation at a point in time, analyzing, using the first electronics device and/or a second electronics device, the captured sound and artificially providing, during the conversation, information to a party to the conversation related to the captured sound based on the analysis to enhance an aspect of the conversation at a subsequent point in time.

In accordance with another exemplary embodiment, there is a method of managing a conversation, comprising utilizing a portable electronics device, electronically analyzing sound captured during the conversation, and based on the analysis, artificially providing an indicator to a participant in the conversation related to how the participant is speaking to improve the conversation, wherein at least one participant the conversation is using a hearing prosthesis to hear.

BRIEF DESCRIPTION OF THE DRAWINGS

Embodiments are described below with reference to the attached drawings, in which.

DETAILED DESCRIPTION

Figure 1:
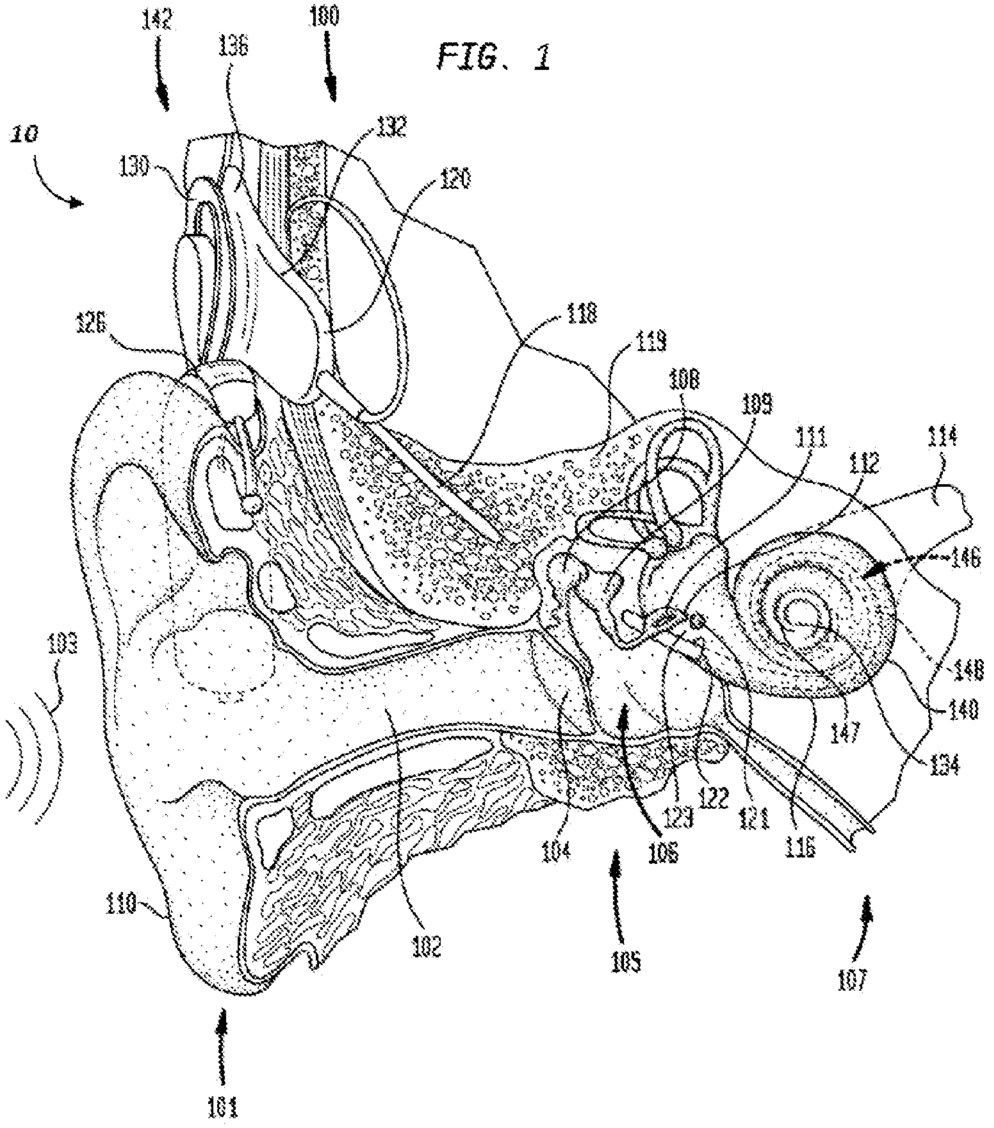
FIG. 1 is a perspective view of an exemplary hearing prosthesis in which at least some of the teachings detailed herein are applicable.

FIG. 1 is a perspective view of a cochlear implant, referred to as cochlear implant 100, implanted in a recipient, to which some embodiments detailed herein and/or variations thereof are applicable. The cochlear implant 100 is part of a system 10 that can include external components in some embodiments, as will be detailed below. Additionally, it is noted that the teachings detailed herein are also applicable to other types of hearing prostheses, such as by way of example only and not by way of limitation, bone conduction devices (percutaneous, active transcutaneous and/or passive transcutaneous), direct acoustic cochlear stimulators, middle ear implants, and conventional hearing aids, etc. Indeed, it is noted that the teachings detailed herein are also applicable to so-called multi-mode devices. In an exemplary embodiment, these multi-mode devices apply both electrical stimulation and acoustic stimulation to the recipient (sometimes referred to as an electro-acoustic stimulator). In an exemplary embodiment, these multi-mode devices evoke a hearing percept via electrical hearing and bone conduction hearing. Accordingly, any disclosure herein with regard to one of these types of hearing prostheses corresponds to a disclosure of another of these types of hearing prostheses, or any medical device for that matter, unless otherwise specified, or unless the disclosure thereof is incompatible with a given device based on the current state of technology. Thus, the teachings detailed herein are applicable, in at least some embodiments, to partially implantable and/or totally implantable medical devices that provide a wide range of therapeutic benefits to recipients, patients, or other users, including hearing implants having an implanted microphone, auditory brain stimulators, pacemakers, visual prostheses (e.g., bionic eyes), sensors, drug delivery systems, defibrillators, functional electrical stimulation devices, catheters, etc.

In view of the above, it is to be understood that at least some embodiments detailed herein and/or variations thereof are directed towards a body-worn sensory supplement medical device (e.g., the hearing prosthesis of FIG. 1, which supplements the hearing sense, even in instances where all natural hearing capabilities have been lost). It is noted that at least some exemplary embodiments of some sensory supplement medical devices are directed towards devices such as conventional hearing aids, which supplement the hearing sense in instances where some natural hearing capabilities have been retained, and visual prostheses (both those that are applicable to recipients having some natural vision capabilities remaining and to recipients having no natural vision capabilities remaining). Accordingly, the teachings detailed herein are applicable to any type of sensory supplement medical device to which the teachings detailed herein are enabled for use therein in a utilitarian manner. In this regard, the phrase sensory supplement medical device refers to any device that functions to provide sensation to a recipient irrespective of whether the applicable natural sense is only partially impaired or completely impaired.

The recipient has an outer ear 101, a middle ear 105, and an inner ear 107. Components of outer ear 101, middle ear 105, and inner ear 107 are described below, followed by a description of cochlear implant 100.

In a fully functional ear, outer ear 101 comprises an auricle 110 and an ear canal 102. An acoustic pressure or sound wave 103 is collected by auricle 110 and channeled into and through ear canal 102. Disposed across the distal end of ear channel 102 is a tympanic membrane 104 which vibrates in response to sound wave 103. This vibration is coupled to oval window or fenestra ovalis 112 through three bones of middle ear 105, collectively referred to as the ossicles 106 and comprising the malleus 108, the incus 109, and the stapes 111. Bones 108, 109, and 111 of middle ear 105 serve to filter and amplify sound wave 103, causing oval window 112 to articulate, or vibrate in response to vibration of tympanic membrane 104. This vibration sets up waves of fluid motion of the perilymph within cochlea 140. Such fluid motion, in turn, activates tiny hair cells (not shown) inside of cochlea 140. Activation of the hair cells causes appropriate nerve impulses to be generated and transferred through the spiral ganglion cells (not shown) and auditory nerve 114 to the brain (also not shown) where they are perceived as sound.

As shown, cochlear implant 100 comprises one or more components which are temporarily or permanently implanted in the recipient. Cochlear implant 100 is shown in FIG. 1 with an external device 142, that is part of system 10 (along with cochlear implant 100), which, as described below, is configured to provide power to the cochlear implant, where the implanted cochlear implant includes a battery that is recharged by the power provided from the external device 142.

In the illustrative arrangement of FIG. 1, external device 142 can comprise a power source (not shown) disposed in a Behind-The-Ear (BTE) unit 126. External device 142 also includes components of a transcutaneous energy transfer link, referred to as an external energy transfer assembly. The transcutaneous energy transfer link is used to transfer power and/or data to cochlear implant 100. Various types of energy transfer, such as infrared (IR), electromagnetic, capacitive and inductive transfer, may be used to transfer the power and/or data from external device 142 to cochlear implant 100. In the illustrative embodiments of FIG. 1, the external energy transfer assembly comprises an external coil 130 that forms part of an inductive radio frequency (RF) communication link. External coil 130 is typically a wire antenna coil comprised of multiple turns of electrically insulated single-strand or multi-strand platinum or gold wire. External device 142 also includes a magnet (not shown) positioned within the turns of wire of external coil 130. It should be appreciated that the external device shown in FIG. 1 is merely illustrative, and other external devices may be used with embodiments of the present invention.

Cochlear implant 100 comprises an internal energy transfer assembly 132 which can be positioned in a recess of the temporal bone adjacent auricle 110 of the recipient. As detailed below, internal energy transfer assembly 132 is a component of the transcutaneous energy transfer link and receives power and/or data from external device 142. In the illustrative embodiment, the energy transfer link comprises an inductive RF link, and internal energy transfer assembly 132 comprises a primary internal coil 136. Internal coil 136 is typically a wire antenna coil comprised of multiple turns of electrically insulated single-strand or multi-strand platinum or gold wire.

Cochlear implant 100 further comprises a main implantable component 120 and an elongate electrode assembly 118. In some embodiments, internal energy transfer assembly 132 and main implantable component 120 are hermetically sealed within a biocompatible housing. In some embodiments, main implantable component 120 includes an implantable microphone assembly (not shown) and a sound processing unit (not shown) to convert the sound signals received by the implantable microphone in internal energy transfer assembly 132 to data signals. That said, in some alternative embodiments, the implantable microphone assembly can be located in a separate implantable component (e.g., that has its own housing assembly, etc.) that is in signal communication with the main implantable component 120 (e.g., via leads or the like between the separate implantable component and the main implantable component 120). In at least some embodiments, the teachings detailed herein and/or variations thereof can be utilized with any type of implantable microphone arrangement.

Main implantable component 120 further includes a stimulator unit (also not shown) which generates electrical stimulation signals based on the data signals. The electrical stimulation signals are delivered to the recipient via elongate electrode assembly 118.

Elongate electrode assembly 118 has a proximal end connected to main implantable component 120, and a distal end implanted in cochlea 140. Electrode assembly 118 extends from main implantable component 120 to cochlea 140 through mastoid bone 119. In some embodiments electrode assembly 118 may be implanted at least in basal region 116, and sometimes further. For example, electrode assembly 118 may extend towards the apical end of cochlea 140, referred to as cochlea apex 134. In certain circumstances, electrode assembly 118 may be inserted into cochlea 140 via a cochleostomy 122. In other circumstances, a cochleostomy may be formed through round window 121, oval window 112, the promontory 123 or through an apical turn 147 of cochlea 140.

Electrode assembly 118 comprises a longitudinally aligned and distally extending array 146 of electrodes 148, disposed along a length thereof. As noted, a stimulator unit generates stimulation signals which are applied by electrodes 148 to cochlea 140, thereby stimulating auditory nerve 114.

Figure 2A:
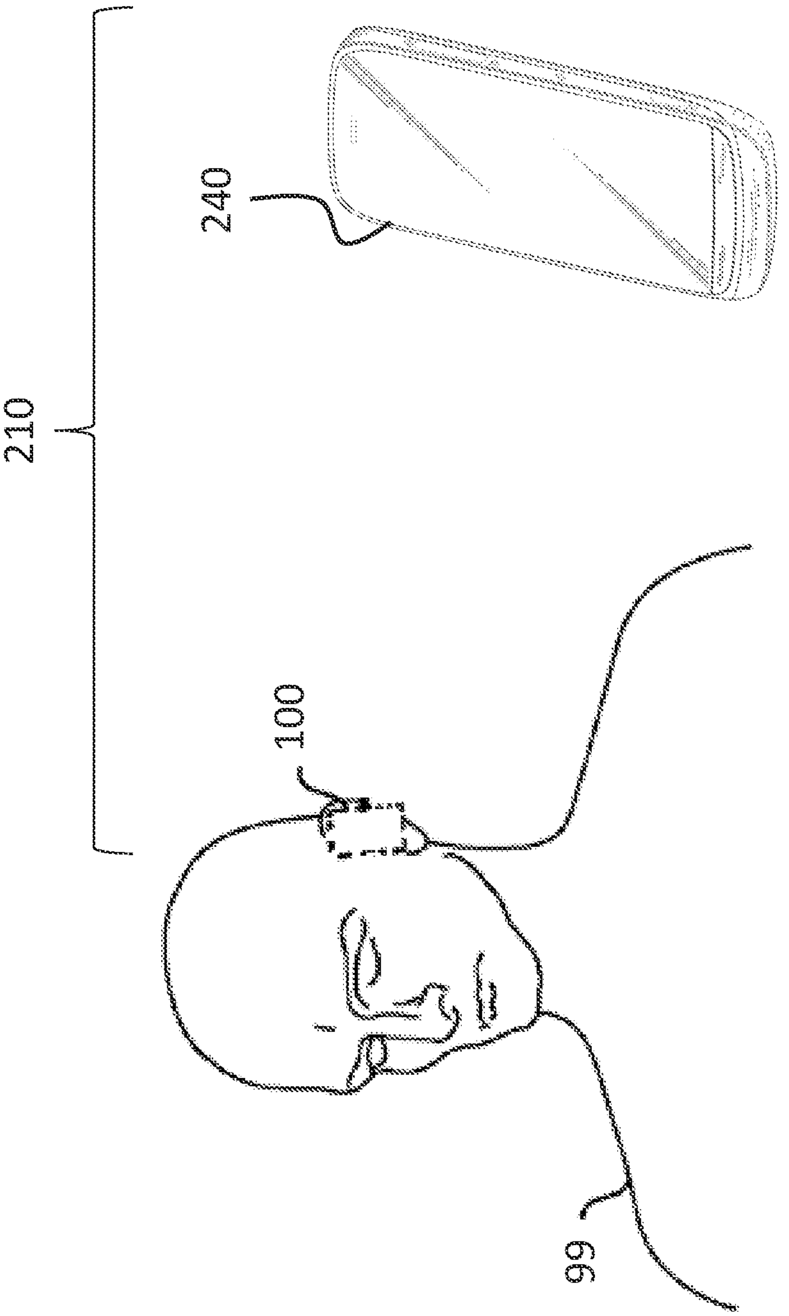
FIGS. 2A and 2B present an exemplary system including a hearing prosthesis and a remote device in the form of a portable hand-held device.
Figure 2B:
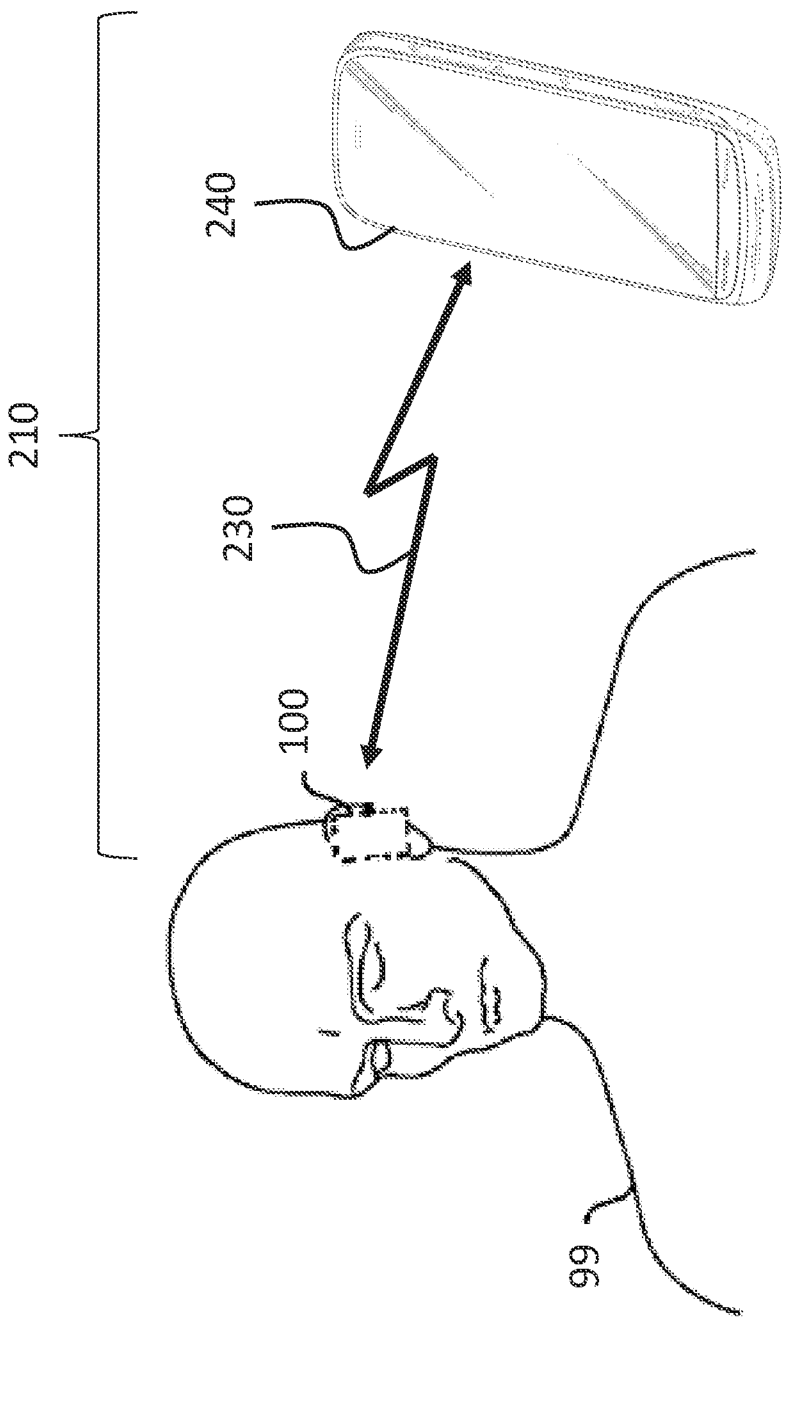

FIGS. 2A and 2B depict an exemplary system 210 according to an exemplary embodiment, including hearing prosthesis 100, which, in an exemplary embodiment, corresponds to cochlear implant 100 detailed above, and a portable handheld device 240. The embodiment of FIG. 2B has a wireless link 230 with the hearing prosthesis 100, whereas the alternate embodiment depicted in FIG. 2A does not have such a link. In an exemplary embodiment, the hearing prosthesis 100 is an implant implanted in recipient 99 (as represented functionally by the dashed lines of box 100 in FIGS. 2A/2B). In an exemplary embodiment, as represented in FIG. 2B, the system 210 is configured such that cochlear implant 100 and the portable handheld device 240 (e.g., a portable cellular telephone, such as by way of example only and not by way of limitation, a smart phone as that phrase is utilized generically) have a relationship. By way of example only and not by way of limitation, in an exemplary embodiment, the relationship is the ability of the smartphone to serve as a control device of the hearing prosthesis 100 via the wireless link 230. Alternatively, or in addition to this, the relationship is to only stream an audio signal captured by the microphone of the smartphone to the hearing prosthesis so the hearing prosthesis can evoke a hearing percept based on that audio stream (other relationships exist, as will be detailed). In some embodiments, the portable hand held device 240 only extends the hearing prosthesis system, but is not a control device of the hearing prosthesis system. That said, in some embodiments, there is a different relationship between the two devices. Instead, for instance, the two devices can be utilized simultaneously to achieve utilitarian value as will be described below. The two devices work completely autonomously relative to one another, although in some such exemplary embodiments, one or both of the devices can be "aware" that one or both devices are being utilized simultaneously with the other. Some additional details of this will be described below. To be clear, in some embodiments, the remote device cannot be used to actively adjust the prosthesis 100, but such does not exclude the ability of the remote device to provide a prompt to the recipient indicating that there can be utilitarian value with respect to the recipients adjusting the hearing prosthesis 100. In some embodiments, pairing between the devices exists during operation of one or more or all of the devices, and this pairing is recognized by one or more or all of the devices.

It is noted that while the embodiments detailed herein will be often described in terms of utilization of a cochlear implant, alternative embodiments can be utilized in other types of hearing prostheses, such as by way of example only and not by way of limitation, bone conduction devices (percutaneous, active transcutaneous and/or passive transcutaneous), direct acoustic cochlear implants (DACI), and conventional hearing aids. Accordingly, any disclosure herein with regard to one of these types of hearing prostheses corresponds to a disclosure of another of these types of hearing prostheses or any other prosthetic medical device for that matter, unless otherwise specified, or unless the disclosure thereof is incompatible with a given hearing prosthesis based on the current state of technology.

Figure 3:
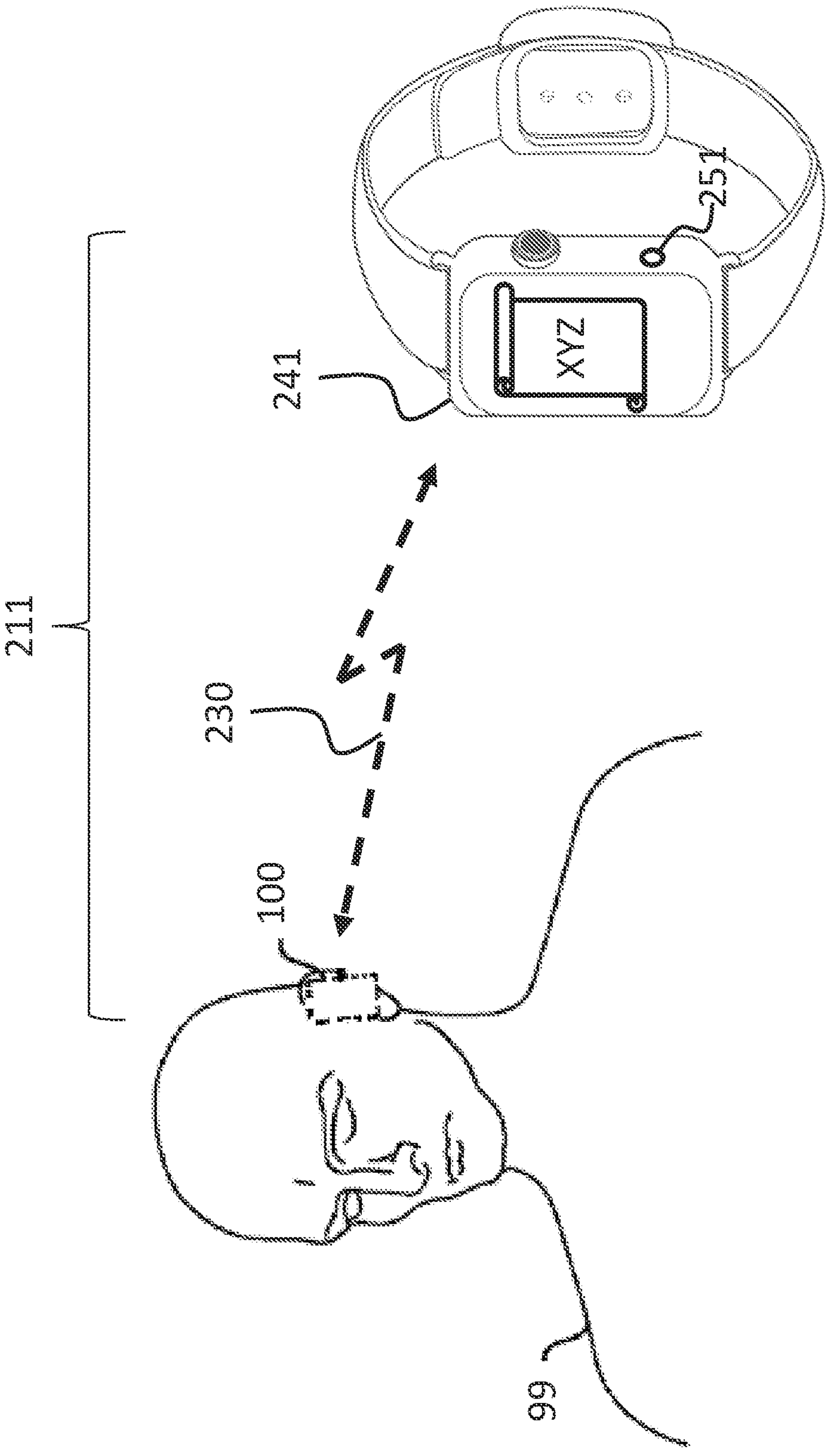
FIG. 3 presents an exemplary system including a hearing prosthesis and a remote device in the form of a smartwatch.

FIG. 3 depicts an exemplary system 211 according to an exemplary embodiment, including hearing prosthesis 100, which, in an exemplary embodiment, corresponds to cochlear implant 100 detailed above, and a portable device 241 having an optional wireless link 230 with the hearing prosthesis 100, where, here, the portable device 241 is a smartwatch. In an exemplary embodiment, the hearing prosthesis 100 is an implant implanted in recipient 99 (as represented functionally by the dashed lines of box 100 in FIG. 2A and FIG. 2B). In an exemplary embodiment, the system 211 is configured such that cochlear implant 100 and the portable device 241 in the embodiment of a smart watch can have a relationship. By way of example only and not by way of limitation, in an exemplary embodiment, the relationship is the ability of the smartwatch 241 to serve as a remote microphone for the prosthesis 100 via the wireless link 230 and/or a control for the prosthesis. However, as is the case with the embodiments detailed above with respect to the smart phone, in some embodiments, there is no relationship. To be clear, any disclosure herein of a feature of the smart phone can correspond to a disclosure of a feature of the smartwatch, and/or vice versa, unless otherwise noted, providing that the art enables such. It is also noted that while the embodiments of FIGS. 2A and 2B and 3 are presented in terms of the remote device being a multiuse smart portable device, in some embodiments, the remote device is a device that is dedicated for implementing the teachings detailed herein. It is also noted that as will be detailed below, in some embodiments, one or more all of the aforementioned devices can be utilized at the same time in a given system and/or as substitutes for another component of the system.

To be clear, in an exemplary embodiment, the teachings detailed herein can be executed in whole or in part by a multiuse smart portable device configured to execute the teachings detailed herein. In some exemplary embodiments, there is a multiuse smart portable device, such as those described above in FIGS. 2A, 2B and FIG. 3 that includes an interactive display screen, which can be a touch screen as is commercially available on smart phones by Apple™ (e.g., iPhone 6™) or Samsung (e.g., Galaxy S7™) as of Jul. 4, 2017. In an exemplary embodiment, the multiuse smart portable device is a body worn device, such as by way of example only and not by way of limitation, with respect to the embodiment of FIG. 3, the smartwatch, which includes a chassis. This chassis, in some embodiments, can be a plastic and/or a metal chassis that supports such exemplary components as an LCD screen upon which images can be presented (e.g., text, pictures, graphics, etc.), where, in some embodiments, the LCD screen can be a touch screen one or more microphones (e.g., 1, 2, 3, 4, 5, 6, 7, 8, 9, 10, or more microphones), one or more speakers (e.g., 1, 2, 3, 4, 5 speakers), and/or one or more vibrators, including the actuator(s) and counterweight(s) (if utilized) thereof a central processing unit (CPU) which can be a computer chip or a computer processor, etc., one or more printed circuit boards, and lugs to which the watchband is attached, an RF transmitter, an RF receiver (e.g., a Wi-Fi and/or Bluetooth transmitter/receiver system), etc. It is noted that in at least some exemplary embodiments, the body worn device 241 corresponds to an Apple Watch™ Series 1 or Series 2, as is available in the United States of America for commercial purchase as of Jul. 4, 2017. In an exemplary embodiment, the body worn device 241 corresponds to a Samsung Galaxy Gear™ Gear 2, as is available in the United States of America for commercial purchase as of Jul. 4, 2017. In an exemplary embodiment, the aforementioned chassis carries one or more all of the components available in the just detailed Samsung and/or Apple devices. It is noted that in at least some exemplary embodiments, the chassis is a single monolithic component, while in other embodiments, the chassis is an assembly of components integrated with respect to one another. It is noted that the body worn device can include two or more chassis. It is noted that in the case of the multiuse smart portable device being a body worn device, the interactive display screen can correspond to the display screen of the aforementioned smartwatches.

In at least some exemplary embodiments of this embodiment, the multiuse smart portable device further comprises a wireless communication suite. In an exemplary embodiment, the wireless communication suite includes an FM/RF receiver and/or transmitter, or an IR receiver and/or transmitter, etc. In an exemplary embodiment, the wireless communication suite is based on Bluetooth technology, and includes a Bluetooth compatible device, such as a Bluetooth transceiver. Thus, in some exemplary embodiments, the multiuse smart portable device is configured to be in signal communication (RF communication, but also, in some other embodiments, IR and/or wired) with a hearing prosthesis and at least one of receive a signal therefrom or send a signal thereto.

In at least some exemplary embodiments, the multiuse smart portable device also includes an operating system, which operating system can include a processor and a memory, along with software and/or firmware and/or hardware to execute one or more of the teachings detailed herein.

In at least some exemplary embodiments, the multiuse smart portable device (which may or may not be a smart phone, and thus may or may not have a portable cellular phone suite), is configured to analyze the signal input indicative of a captured sound and provide output regarding the captured sound. In an exemplary embodiment, the input is the captured sound, which can be captured via the microphone of the multiuse smart portable device, or other microphone that is in wired communication with the multiuse smart portable device. In an exemplary embodiment, the input is a signal from the prosthesis that is based upon ambient sound captured by the microphone of the prosthesis. By way of example only and not by way of limitation, the microphone 126 of the BTE device can capture sound, and the BTE device can output a wireless signal via an RF transmitter/transceiver, which wireless signal will be received by the RF receiver of the multiuse smart portable device, that signal corresponding to the signal input indicative of a captured sound. Corollary to this is that in an exemplary embodiment there is an assembly, comprising a device configured to receive input indicative of a captured sensory stimulating phenomenon and provide output regarding the captured sensory stimulating phenomenon that enhances a future sensory input of a person from a future sensory stimulating phenomenon, this assembly corresponding to a smart phone, a personal computer having a computer readable medium programmed to execute the teachings detailed herein, a dedicated consumer electronics product, etc. Also, some embodiments of this assembly include a microphone component that is in wireless communication/configured to be in such communication with a hearing prosthesis. Indeed, in an exemplary embodiment, the assembly is a remote microphone modified or otherwise with such expanded capabilities as those detailed herein with respect to the device remote from the hearing prosthesis, such as the device of FIG. 5 or FIG. 6, by way of example and not by way of limitation. The microphone can be the device configured to receive input indicative of a captured sensory stimulating phenomenon, and in other embodiments can be a dedicated remote microphone combined with a wireless receiver/transceiver that receives a signal from the hearing prosthesis indicative of a captured sensory stimulating phenomenon. The assembly can include a processor that analyzes this input, whether from the microphone or from the prosthesis (or both, in some embodiments), and develops the output regarding the captured sensory stimulating phenomenon that enhances a future sensory input of a person from a future sensory stimulating phenomenon based on the analysis.

In an exemplary embodiment, the multiuse smart portable device includes the aforementioned devices and systems, and is otherwise configured to execute the methods detailed herein so as to analyze the signal input indicative of a captured sound.

In some instances, the phrase "deleteriously affect a hearing percept of another sound" will be used herein, or variations thereof. This means that the sound makes it effectively harder to hear another sound. This as opposed to general sounds that exist in the environment. By way of example, wind noise can have a deleterious effect on another sound, but only in some instances, such as depending on how fast the wind is blowing. For example, a one kilometer per hour breeze may not have a deleterious effect on the other sound, whereas a 22.7 km breeze will almost certainly have a deleterious effect on another sound.

Briefly, as will be seen below, in some embodiments, the multiuse smart portable device is configured to be in signal communication with a hearing prosthesis, such as prosthesis 100 detailed above, and the output regarding the captured sound is a signal to the hearing prosthesis to at least one of adjust a setting thereof, inform a recipient to adjust a setting thereof, or inform the recipient of a feature of the ambient environment in which the device is located. In this regard, in an exemplary embodiment, a party to a conversation, scenarios of such conversations which can be described below, can input control commands into the multiuse smart portable device that will adjust a setting of the hearing prosthesis, such as adjust the volume or gain, etc., and/or, based on the analysis, the multiuse smart portable device can be configured to automatically output the signal so that the setting of the prosthesis is adjusted. Still further, the multiuse device can be configured to inform the recipient to adjust a setting thereof, where the recipient can manually adjust the hearing prosthesis via an input suite thereof, such as by pressing a button or turning a knob on the BTE device. Still further, the device can be configured to inform the recipient of a feature of the ambient environment in which the device is located, such as indicating to the recipient that the ambient environment contains background noise that is deleterious to a sound of interest, such as the sound of the person speaking to the recipient.

In an exemplary embodiment where the device is configured to control a hearing prosthesis, in at least some exemplary embodiments, the device is configured to display control settings on the display screen to control the hearing prosthesis based on the analysis of the signal so that the recipient can adjust the hearing prosthesis based on the output. By way of example only and not by way of limitation, in an exemplary embodiment where the analysis determined that there is too much background noise in the received signal, the hearing prosthesis automatically presents, on the display screen, the controls for beamforming. The recipient can input using his or her fingers the desired control input to adjust a beamforming so that the microphone(s) of the hearing prosthesis, such as the microphones on the BTE device, are beamformed to the speaker/are taken out of omnidirectional service. In an exemplary embodiment, by way of example only and not by way of limitation, if the analysis determined that the speaker was not speaking loud enough, in an exemplary embodiment, the multiuse smart portable device could automatically call up the volume control and display such on the screen, so that the recipient could increase the volume of the prosthesis. Note further that in an exemplary embodiment of such a scenario, the volume control that could appear could be the volume control that is limited to certain frequencies, such as the frequencies associated with speech.

It is briefly noted that in some exemplary embodiments, the multiuse smart portable device can utilize a learning algorithm that can learn over time what types of sounds or what types of speech or what actions or otherwise what scenarios have a deleterious effect on other sounds. In some embodiments, this is via the use of a machine learning algorithm, which can be executed utilizing a remote processor which can be accessed via the Internet periodically so as to update the algorithms and the smart portable device, while in other embodiments, this can be via simple input from the recipient indicating to the multiuse smart portable device that the given scenario should be ignored or otherwise discounted. With respect to the latter, as a result of a number of instances occurring where a given scenario results in output by the device and then subsequent input from the recipient that the scenario should be ignored or otherwise that no action to be taken, the multiuse smart portable device will learn that such a scenario should not result in an indication to one or more of the speakers to the conversation. Conversely, the reverse can be true: in an exemplary embodiment, the multiuse smart portable device can learn that a given scenario is a scenario that should cause the device to provide an indication, whereas prior to the learning, no indication was provided when the given scenario occurred.

It is briefly noted that the smartwatch, in some embodiments, is representative of any body worn device that can have utility vis-à-vis the smart watch in whole or in part. Thus, in an exemplary embodiment, any smartwatch disclosed herein corresponds to a disclosure of another type of body worn device, such as a pendant on a neckless, a ring configured to be worn on a finger of a person, etc. In an exemplary embodiment, the chassis of the smartwatch is mounted in a neck chain, where there is no wrist band. In an embodiment, the chassis is a modified chassis to be more tactually and/or visually consistent with a pendant worn about the neck, etc.

In some exemplary embodiments the systems 210/211 are configured to enable the portable electronics device to reproduce the functionality of a given input device of the hearing prosthesis 100 (e.g., the input device is a button, such as a push button, a knob, a heat sensitive pad, etc., alone or in combination with another output device, such as an LED) at the portable electronics device. By way of example only and not by way of limitation, the input device could be a knob on the BTE device 246 that is adjusted by the recipient to increase or decrease the perceived volume of the resulting hearing percept evoked by the hearing prosthesis 100. The functionality of this knob thus being the control, or at least adjustment, of the perceived volume which is perceived by the recipient, or the volume that is correlated to an output of the prosthesis (any volume phenomenon quantifiable and/or qualifyable in relation to a device and/or recipient can be an adjusted volume in some embodiments). In an exemplary embodiment, the hearing prosthesis is configured such that the portable electronics device has this functionality. Still further, in an exemplary embodiment, functions such as those that result in turning the processor of the hearing prosthesis on and off, changing maps of the hearing prosthesis and/or the initiation and/or halting of streaming are present in the portable electronics device. That said, in some embodiments, the system 210/211 is not configured to enable the portable electronics device to reproduce the functionality of a given input device of the hearing prosthesis 100, as indicated above.

In an exemplary embodiment, the hearing prosthesis 100 captures sound via the microphone on, for example, the BTE 126, or an Off-The-Ear sound processor, or via a remote microphone in signal communication thereto, and, in this embodiment, transmits data to the remote device 240, which, in an exemplary embodiment, can correspond to a raw output signal of the microphone via link 230. (Off-The-Ear (OTE) sound processors are retained against the skin of the recipient between the 9 and 12 o'clock position from the ear canal (e.g., about at the 10, 10:30 or 11 o'clock position more than 2 and less than 5 inches away therefrom in a human that is older than 10 years old meeting at least the $50^{th}$ percentile of such a human.) This is functionally represented by FIG. 4, which depicts the hearing prosthesis 100 and remote device 240/241 in black box format, where input 3144 corresponds to input into the microphone of the prosthesis 100.

The remote device 240/241 receives the signal via link 230, if present, and processes the data in a utilitarian manner, some of the details of which will be described below. Briefly however, in an exemplary embodiment, the remote device processes the data to evaluate the sound that is being captured by the microphone of the prosthesis 100, and automatically determines whether a change should be made to either the prosthesis or with respect to a more general feature that can enhance the hearing percept that is delivered to the recipient. In some embodiments, the remote device is configured to indicate what change should be made. In an exemplary embodiment, this change is made, and the hearing prosthesis 100 thus evokes a hearing percept via output 3246 to tissue of the recipient (where output 3246 corresponds to electrical stimulation in the case of the hearing prosthesis 100 being a cochlear implant, and output 3246 corresponds to vibrations in the case of a bone conduction device, etc.) in a manner that has more utilitarian value than that which would be the case in the absence of the change.

In view of the above, there is, in an exemplary embodiment, a system, such as system 210/211. However, in an exemplary embodiment, the system can also be limited to one or the other of the prosthesis 100 or the remote device 240/241.

Figure 5:
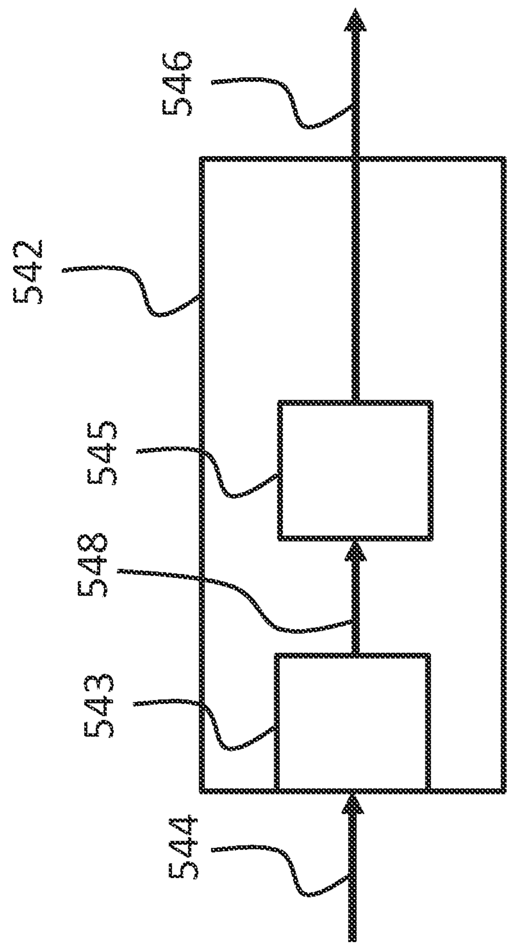
FIG. 5 presents a functional representation of an exemplary system.

FIG. 5 depicts, in black box format, box 542, which can correspond to the prosthesis 100 or the remote device 240/241. That said, box 542 can also functionally represent both components, bifurcated as appropriate. In an exemplary embodiment, the system comprises a sound signal input suite, which can include, by way of example only and not by way of limitation, the microphone and, in some embodiments, the related circuitry of the prosthesis 100, which can include, by way of example only and not by way of limitation, in an exemplary embodiment, an amplifier or the like, and, in some instances, an analog and/or digital signal processor. Still, in some embodiments, the sound signal inputs can correspond to the inputs from microphone 126 on the BTE, and/or the microphone of the remote device 240/241. In FIG. 5, the sound input suite is represented in black box format by element 543, where arrow 544 functionally represents sound input traveling through an ambient atmosphere to the sound input suite 543. In an exemplary embodiment, sound input suite 543 includes a microphone. That said, in an embodiment where the sensory stimulation evoking phenomenon is a phenomenon that evokes a vision percept (e.g., the phenomenon is light), element 543 is a light input suite that includes a camera. To be clear, any disclosure herein of a microphone or the like corresponds to a disclosure of an alternate embodiment where the sensory stimulation evoking phenomenon capture device is another type of device, such as a camera, or any other phenomenon capture device, such as a device to captures aromas, etc. It is also noted that any disclosure herein with respect to a hearing prosthesis corresponds to a disclosure of an alternate embodiment where the prosthesis is another type of sensory prosthesis, such as a vision prosthesis, a tactile sensory evoking prosthesis, a smell evoking prosthesis, etc. Accordingly, in some exemplary embodiments, with respect to arrow 544, arrow 544 represents any phenomenon that evokes a sensory stimulation in a recipient. Further, while the teachings detailed herein are generally focused on conversations and sound, it is to be understood that any such disclosure herein corresponds to a disclosure in an alternate embodiment where the conversation is instead a gathering of people that the recipient can see, if only aided by the visual prostheses, and the teachings detailed herein are utilized to ultimately enhance the vision percept of the recipient of the vision prosthesis. Thus, the downstream device(s) from device 543 are configured to evaluate that input, whatever its pertinent form, or otherwise work with that input and provide an output that is concomitant with utilizing the teachings detailed herein to enhance the vision experience.

Figure 6:
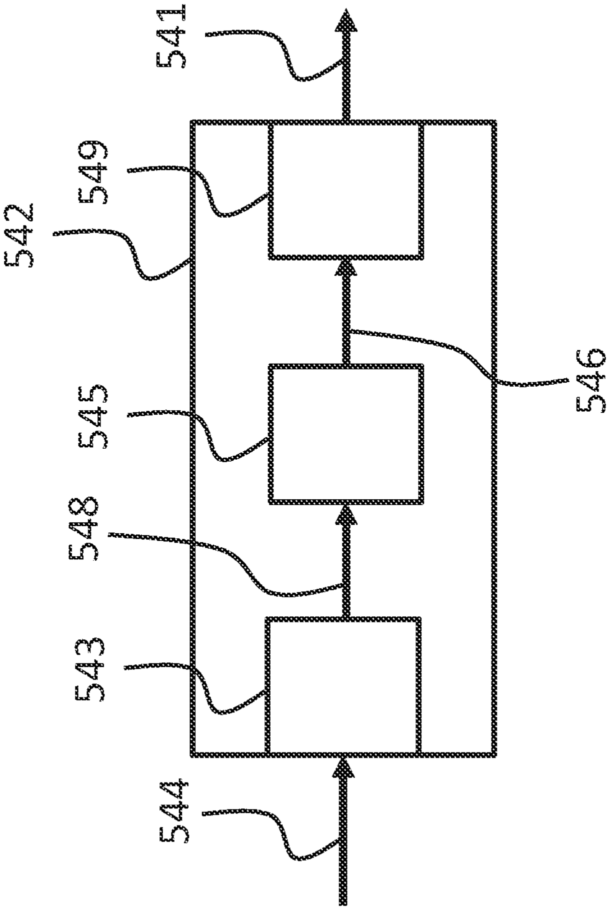
FIG. 6 presents a functional representation of another exemplary system.

The system can further include a processor, functionally represented by processor 545 in FIG. 5. In an exemplary embodiment, processor 545 is configured to analyze output from the sound signal input suite, the output based on a signal received by the sound signal input suite 543, represented by the arrow 548 pointing to the right in FIG. 5 emanating from the box 543, and output a signal that causes the system to output data indicative of an instruction related to data related to a recipient of a hearing prosthesis, the output represented by arrow 546 (the instruction related to data related to a recipient of a hearing prosthesis will be described in greater detail below). In an exemplary embodiment, output 546 provided to any one or both of the prostheses and/or the remote device(s). In an exemplary embodiment, as seen in FIG. 6, one of the devices also includes an output suite 549, which output suite 549 outputs a signal 541. In an exemplary embodiment, output suite 549 is a display that presents there on text indicating the instruction. In an exemplary embodiment, output suite 549 is an LED associated with permanent text, which text corresponds to the text of the instruction, where the illumination or, alternatively, the elimination of the LED calls attention to people in visual site of the particular device the people in visual site of the particular device can read the particular text associated with the LED. That said, in an exemplary embodiment, the LED is simply an LED the meaning of which is known to the recipients beforehand. In an exemplary embodiment, the LED can change colors, from, for example, red, to blue to green, each of the different colors representing a different instruction.

It is noted that in at least some exemplary embodiments, the aforementioned displays or the aforementioned indicators can be co-located with a remote microphone or any other remote sensory stimulation evoking phenomenon capture device (e.g., a remote camera for a vision prosthesis, etc.). For example, in at least some exemplary embodiments, the aforementioned LED(s) can be provided with the remote microphone. In this way, a combined device is provided that provides for both remote sensory stimulation evoking phenomenon capture as well as the indications detailed herein.

Any disclosure herein of a device or system that provides information to one or more parties to a conversation also corresponds to a disclosure of a device that is combined with a device that captures the sensory stimulation evoking phenomenon, and visa-versa, unless otherwise specified or otherwise not enabled by the art.

It is briefly noted that the arrow 548 can represent the link between the hearing prostheses and the remote portable device, in at least some exemplary embodiments. That is, the schematic of FIG. 5 is presented in functional terms, to correspond both to a situation where everything depicted in FIG. 5 corresponds to only one of the two devices of FIGS. 2A and 2B, and in an embodiment where the components associated with FIG. 5 are distributed between the two devices.

In an exemplary embodiment, the processor 545 can be a standard microprocessor supported by software or firmware or the like that is programmed to evaluate the signal received from the sound input suite 543. By way of example only and not by way of limitation, in an exemplary embodiment, the microprocessor can have access to lookup tables or the like having data associated with spectral analysis of a given sound signal, by way of example, and can compare features of the input signal and compare those features to features in the lookup table, and, via related data in the lookup table associated with those features, make a determination about the input signal, and thus make a determination related to sound 544. In an exemplary embodiment, the processor is a processor of a sound analyzer. The sound analyzer can be FFT based or based on another principle of operation. The sound analyzer can be a standard sound analyzer available on smart phones or the like. Sound analyzer can be a standard audio analyzer. The processor can be part of a sound wave analyzer. Moreover, it is specifically noted that while the embodiment of FIG. 5 presents the processor 545 as part of one of the devices of the hearing prosthesis or the portable electronics device, it is noted that in some exemplary embodiments, the processor can be remote from both of these devices. By way of example only and not by way of limitation, in an exemplary embodiment, one or both of the devices of system 210 and/or 211 can be in signal communication via Bluetooth technology or other RF signal communication systems, with a remote server that is linked, via, for example, the Internet or the like, to a remote processor. Signal 548 is provided via the Internet to this remote processor, whereupon the signal is analyzed, and then, via the Internet, the signal indicative of an instruction related to data related to a recipient of the hearing prostheses can be provided to the device at issue, such that the device can output such. Note also that in an exemplary embodiment, the information received from the remote processor can simply be the results of the analysis, whereupon the processor can analyze the results of the analysis, and identify the instruction, and output such instruction. It is noted that the term "processor" as utilized herein, can correspond to a plurality of processes linked together, as well as one single processor.

In view of the above, it can be seen that in an exemplary embodiment, there is a system, comprising a signal input, a processor, and a signal output. In this exemplary embodiment, the processor is configured to generate an instruction related to data related to a recipient of a sensory prosthesis based on input into the signal input, and the signal output is configured to output data indicative of the instruction. The data indicative of the instruction can be data indicative of any of the instructions detailed herein. This embodiment can be modified or expanded or otherwise varied to include any of the teachings detailed herein and/or variations thereof. In some of these embodiments, the processor is configured to analyze the data related to the recipient and determine whether a person speaking is providing sensory input in a manner that enhances a sensory percept of the recipient of the sensory prosthesis. In some of these embodiments, the system is configured to provide the instruction to a person that is part of a group of people providing sensory input captured by the system other than the recipient of the sensory prosthesis.

Figure 4:
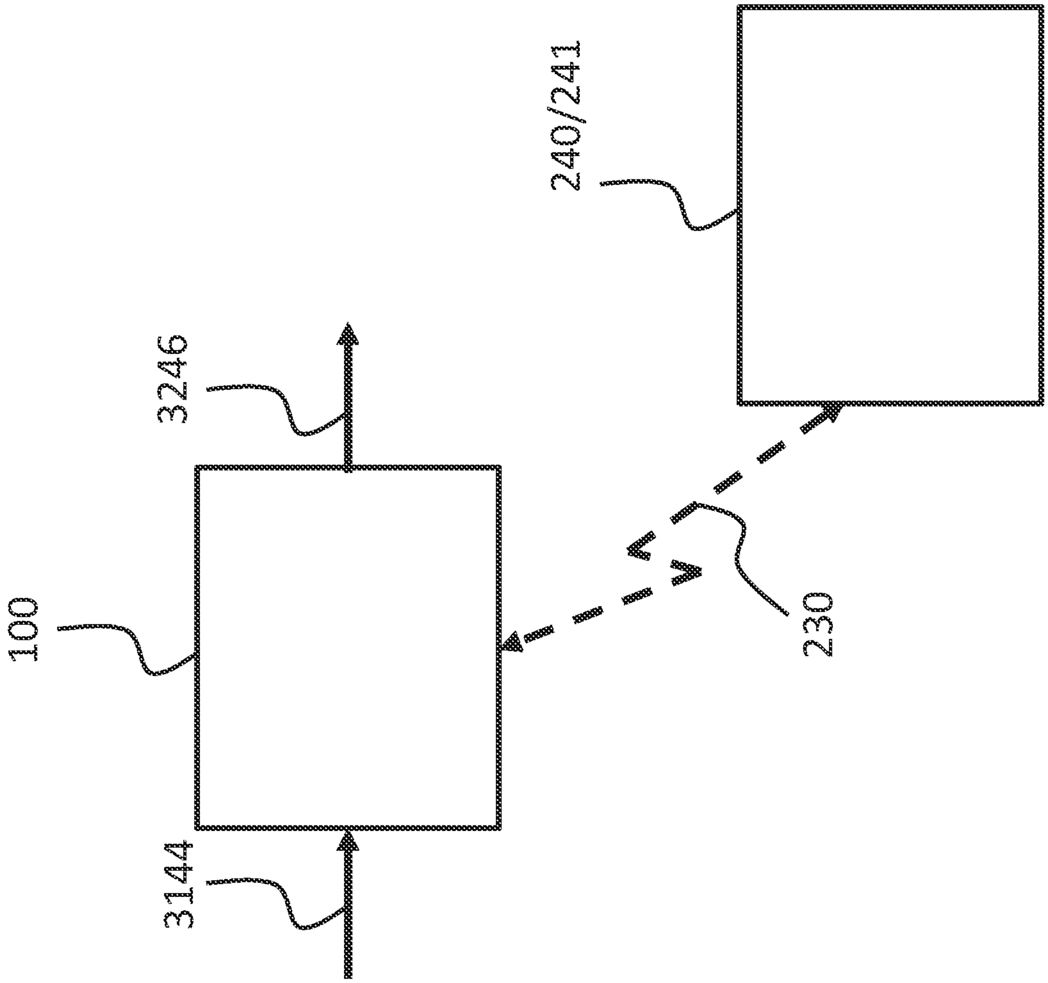
FIG. 4 presents an exemplary functional arrangement detailing communication between black boxes of the hearing prosthesis and a black box of the remote device.

Also in view of the above and in view of FIG. 4, it can be seen that in an exemplary embodiment, there is a device comprising a prosthesis (e.g., 100) configured to operate with a remote sensory evoking phenomenon capture device (e.g., 240/241) that also includes an indicator, wherein the prosthesis is configured to provide input to the remote device related to a captured sensory stimulation evoking phenomenon captured by the prosthesis and/or the remote device so that the remote device provides an indication related to the phenomenon via the indicator. As will be detailed below, in some embodiments where the prosthesis is a hearing prosthesis, the remote device is a remote microphone apparatus used with a hearing prosthesis, as opposed to a smartphone or a smartwatch. The remote microphone has expanded capabilities to execute the functional features just noted. Any arrangement that can enable an indicator that is configured to provide an indication regarding the captured sensory stimulating phenomenon to enhance a future sensory input from a future sensory stimulating phenomenon can be used in some embodiments, whether such is in the form of a remote microphone, a smartphone, or a dedicated consumer electronics product that has that functionality (in some embodiments, only has one or more or all of the functionalities herein, and nothing more), etc. Thus, some embodiments include a device that interfaces with a prosthesis that is configured to analyze the captured phenomenon and develop the input to the remote device (e.g., via an onboard processor of the prosthesis), wherein the input is input instructing the indicator to indicate that one or more people within visual sight of the indicator should take an action that impacts a future sensory input from a future sensory stimulating phenomenon In an exemplary embodiment, the system includes a speech analyzer, such as by way of example only and not by way of limitation, one that is configured to perform spectrographic measurements and/or spectral analysis measurements and/or duration measurements and/or fundamental frequency measurements. By way of example only and not by way of limitation, such can correspond to a processor of a computer that is configured to execute SIL Language Technology Speech Analyzer™ program. In this regard the program can be loaded onto memory of the system, and the processor can be configured to access the program to analyze or otherwise evaluate the speech. In an alternate embodiment, the speech analyzer can be that available from Rose Medical, which programming can be loaded one to the memory of the system.

In an exemplary embodiment, the system includes an audio analyzer, which can analyze one or more of the following parameters: harmonic, noise, gain, level, intermodulation distortion, frequency response, relative phase of signals, etc. It is noted that the above-noted sound analyzers and/or speech analyzers can also analyze one or more of the aforementioned parameters. In some embodiments, the audio analyzer is configured to develop time domain information, identifying instantaneously amplitude as a function of time. In some embodiments, the audio analyzer is configured to measure intermodulation distortion and/or phase. In an exemplary embodiment, the audio analyzer is configured to measure signal-to-noise ratio and/or total harmonic distortion plus noise.

To be clear, in some exemplary embodiments, the processor is configured to access software, firmware and/or hardware that is "programmed" or otherwise configured to execute one or more of the aforementioned analyses. By way of example only and not by way of limitation, the system can include hardware in the form of circuits that are configured to enable the analysis detailed above and/or below, the output of such circuitry being received by the processor so that the processor can utilize that output to execute the teachings detailed herein. In some embodiments, the processor utilizes analog circuits and/or digital signal processing and/or FFT. In an exemplary embodiment, the analyzer engine is configured to provide high precision implementations of AC/DC voltmeter values, (Peak and RMS), the analyzer engine includes high-pass and/or low-pass and/or weighting filters, the analyzer engine can include bandpass and/or notch filters and/or frequency counters, all of which are arranged to perform an analysis on the incoming signal so as to evaluate that signal and identify certain characteristics thereof, which characteristics are correlated to predetermined scenarios or otherwise predetermined instructions and/or predetermined indications as will be described in greater detail below. It is also noted that in systems that are digitally based, the system is configured to implement signal analysis utilizing FFT based calculations, and in this regard, the processor is configured to execute FFT based calculations.

Note that the above instruction is an instruction by machine telling a human being to do certain actions, as opposed to a mere suggestion, the latter being an indication (which is a genus of the species of instruction).

It is noted that while the embodiments described above have been described in terms of black box 542 corresponding to one or both or all of the prostheses, the smart phone and the smartwatch, it is noted that black box 542 can correspond to another type of device, such as by way of example only and not by way of limitation, a device that is limited to and solely dedicated to performing the methods detailed herein and/or otherwise enabling the functionality detailed herein and nothing else. By way of example only and not by way of limitation, box 542 can be a metal or plastic box that supports a microphone and/or a RF receiver and/or a line input jack (e.g., that can be hooked up to a microphone), that includes therein the aforementioned processor, and includes an output suite configured to output the aforementioned instruction, which outputs we can correspond to a speaker, can correspond to an LCD, an LED with permanent text associated therewith, can correspond to an output jack that can be hooked up to a speaker or a television, etc.

The above-described system can have utilitarian value with respect to providing an indication to one or more members of a conversation that a person that is part of the conversation can speak in a different manner to enhance the hearing percept of the person wearing the hearing prosthesis. In this regard, the aforementioned "instruction related to data related to a recipient of a hearing prosthesis" is such that the data related to a recipient of a hearing prosthesis is how well the recipient can hear with the prosthesis, and thus the instruction, which can be an instruction to a party to the conversation to act in a certain manner that can improve the hearing, is thus an instruction related to the data.

In an exemplary embodiment, the processor is configured to analyze the signal received from the sound signal input suite and determine whether a person speaking is speaking in a manner that enhances a hearing percept of the recipient of the hearing prosthesis. By way of example only and not by way of limitation, in an exemplary embodiment, the processor can evaluate a volume (amplitude) of the output correlated to temporal measurements and extrapolate therefrom that the speaker is frequently speaking in a manner that is not as utilitarian as otherwise might be the case. Accordingly, based on the evaluation, the processor can determine whether the speaker is speaking towards the microphone, and thus whether the speaker is speaking in a manner that enhances a hearing percept of the recipient with the hearing prosthesis. Note that determining whether the speaker is speaking in a manner that enhances a hearing percept includes determining that the speaker is so speaking, determining that the speaker is not so speaking, and/or determining both. That is, determining whether the speaker is speaking towards the microphone includes determining that the speaker is speaking towards microphone, determining that the speaker is not speaking towards microphone, and/or determining both.

Determining whether the speaker is speaking in a manner that enhances a hearing percept can be done where there is a baseline that the speaker is so speaking, and the processor determines that speaker is not so speaking. Determining whether the speaker is speaking in a manner that enhances a hearing percept can be done where there is a baseline that the speaker is not so speaking, and the processor determines that the speaker is so speaking. Determining whether the speaker is speaking in a manner that enhances a hearing percept can be done both ways, consistent with the teachings in the prior paragraph.

In an exemplary embodiment, the system is configured such that if the speaker speaking in a manner that enhances a hearing percept of the recipient, the second signal may or may not be output. By way of example only and not by way of limitation, if the baseline of the system is that the system only provides the instructions in the event that the speaker is speaking in a manner that enhances the hearing percept, that is the only time that the second signal will be output, which output can result in the system outputting instructions to speaker to continue speaking in a manner than he or she has been speaking (e.g., a green LED will be illuminated). In such a system that has such a baseline, the second signal will not be output if the speaker is not speaking in a manner that enhances the hearing percept (e.g., the green LED will not be illuminated). Conversely, if the baseline of the system is that the system only provides the instructions in the event that the speaker is not speaking in a manner that enhances the hearing percept (which includes a scenario where the speaker can speak in a different manner than he or she is speaking that enhances the hearing percept relative to that which is the case the way the speaker is currently speaking), the second signal will be output, and such can result in the system outputting instructions to the speaker to speak in a different manner than he or she is speaking (e.g., a red LED will be illuminated). In such a system that has such a baseline, the second signal will not be output if the speaker is speaking in a manner that enhances the hearing percept (e.g., the red LED will not be illuminated). That said, in an exemplary embodiment where there is no true baseline, but the system outputs instructions in both scenarios, a second signal can be outputted that results in the system providing instructions to keep speaking in the same way (e.g., the green LED is illuminated), and then subsequently, a second signal to be outputted that results in the system providing instructions to the speaker to speak in a different manner (e.g., the red LED is illuminated).

Such scenarios analyzed by the processor based on the first signal to determine whether a person speaking is speaking in a manner that enhances a hearing percept of the recipient can include using a relative analysis, such as analyzing whether the speaker could speak and/or could not speak louder or softer, slower or faster, more deeply (Darth Vader) or less deeply, etc.

It is noted that in some embodiments, the above described system can have utilitarian value with respect to providing an indication to one or more members of a conversation that too many speakers are speaking at the same time and/or that too many too many speakers are speaking in close speakers are speaking in to close of temporal proximity to one another. Such can correspond to a scenario where it makes it more difficult for the recipient to manage or otherwise understand what meaning of the sound captured by the prostheses relative to that which would be the case if one or more speakers were not speaking at the same time as one or more other speakers and/or one or more speakers were not speaking in to close of temporal proximity to one or more other speakers. In an exemplary embodiment, the system can be configured to provide output indicative of an indication that too many people are speaking in to close of temporal proximity to one another. The indication can be a general indication that such is the case, and/or can be an indication that one or more particular speakers of the group of speakers is causing the "problem." In an exemplary embodiment, the system can output an instruction to the group of speakers or to one or more individual speakers that collectively amount to a total that is less than all of the individual speakers to avoid speaking in too close of temporal proximity to other speakers.

It is noted that in an exemplary embodiment, the above identification as to whether this person speaking is a person with the hearing prosthesis can be executed utilizing a processor program to receive the various data detailed above and to analyze that data to make the identification. If-then-else algorithms can be utilized to make the identification.

In an exemplary embodiment, the system is configured to provide instructions to the recipient of the hearing prosthesis. By way of example only and not by way of limitation, the system can provide instructions to the recipient to speak louder or softer, slower or faster, more deeply or less deeply, etc. These instructions can be text instructions to the recipient, such as text presented on an LCD of the system, these instructions can be symbol based (up arrow indicates speak louder, down arrow indicates speak softer, left arrow slower, right arrow faster, etc.), these instructions can be light/text correlated, or simply can be like correlated, where the recipient understands prior to the use of systems what certain lights mean. By way of example only and not by way of limitation, an instruction manual can be provided with the system, where the recipient reads the instruction manual, and memorizes the meanings of three or four or five or six different colors of LEDs and/or positions thereof, etc., and thus when a light color and/or a light position is illuminated, that will have meaning to the recipient. The fact that the recipient may be the only one that understands the output of the system is an exemplary embodiment where the system is configured to provide instructions the recipient of the hearing prosthesis.

Alternatively, and/or in addition to this, system is configured to provide the instruction to a person that is part of the conversation other than the recipient of the hearing prostheses. In this regard, any or all of the above aforementioned ways to provide instructions can be utilized. Note that in some exemplary embodiments, the system is configured to provide instructions solely to non-recipients, while in other embodiments, the system is configured to provide instructions solely to the recipient, while in other embodiments, the system is configured to provide instructions to both the recipient and non-recipients. Because some embodiments of the system detailed herein are configured to only provide instructions to a non-recipient, the system can be configured to identify whether the person speaking is a person without the hearing prosthesis. In an exemplary embodiment, such can be done by one or more of the aforementioned manners detailed above with respect to the embodiment where the system is configured to identify whether the person speaking is a person with the hearing prostheses. It is noted that in at least some exemplary embodiments, the system can identify both whether the person speaking is a person with the hearing prosthesis and whether the person speaking is a person without the hearing prosthesis.

There is utilitarian value with respect to determining whether or not the speaker is the speaker with the hearing prosthesis. In an exemplary embodiment, the system can be configured to develop the instructions based on only the speech of the hearing prosthesis, which instructions can be explicitly directed to only the recipient. By way of example only and not by way of limitation, in an exemplary embodiment, the system can be configured to be a discrete system, which only provides the instructions to the recipient, which instructions are provided in a manner that is transparent to the other speakers in the conversation or otherwise unobserved/unobservable/unnoticeable by the speakers in the conversation of the recipient. In this regard, in an exemplary embodiment, the system can be such that the system is configured to output a tactile and/or audible indication to the recipient that can only be noticed or otherwise can is only hard to notice by the other speakers. By way of example only and not by way of limitation, such as where the system includes the BTE device, BTE device can include a vibratory device that vibrates, which vibrations are transferred to the skin of the recipient, thus providing instructions to the recipient that the recipient should speak in a different manner otherwise do something differently.

Note also that this tactile system can be implemented in a smartphone. By way of example only and not by way of limitation, in an exemplary scenario of use, the recipient holds the smart phone, which smart phone includes one or more of the components of FIG. 5, and the smart phone vibrator can vibrate, and because the recipient is holding smart phone, those vibrations will be sensed by the recipient, and likely no one else.

In an exemplary embodiment, such as where the system is configured to evoke an audible indication, the prosthesis can be configured to automatically evoke a hearing percept in the recipient indicative of an instruction, such as speak louder or speak slower, etc. Depending on the type of hearing prosthesis, this instruction can be impossible to hear by the other recipients, such as by way of example only and not by way of limitation, where the hearing percept is evoked utilizing a cochlear implant.

Still with respect to embodiments where the system is configured to determine who the speaker is, in an exemplary embodiment where the system is configured to determine that the speaker is a speaker other than the recipient of the hearing prostheses, the system can be configured to provide the instructions only based on the speech of the non-recipient. In an exemplary embodiment, the system can be implemented in a BTE device, which BTE device has an ear hook that extends about the fronts of the ear of the recipient. In an exemplary embodiment, the BTE device can include one or more LEDs which can, in some embodiments, change different colors. In an exemplary embodiment, during a conversation, the LEDs can illuminate at different colors and/or different LEDs can illuminate, thus providing instructions to the non-recipient speaker. Because speakers will typically look at the face of each other when speaking, the speaker will be able to see the ear hook of the recipient, and thus be able to see these visual cues in a relatively undistracted manner. In this regard, in an exemplary embodiment, the recipient may not be aware that the prosthesis is providing the instructions to the speaker, such as because the LEDs are out of the field of view of the recipient. Such can have utilitarian value with respect to avoiding self-consciousness of the recipient. In an exemplary embodiment, at the beginning of a conversation, the recipient can explain to the non-recipient speaker what the various indicators mean, and thus the non-recipient speaker can take those cues during the conversation. Such can have utilitarian value with respect to scenarios where people frequently speak to the same people, which happens in many scenarios in the post industrialized world. In this regard, there will be at least a handful of people that will learn over time what the indicators mean, based on at least repetition, and will be able to better converse with the recipient.

As noted above, in some embodiments, the system can be configured to analyze the received signal to develop data relating to microphone placement. In some embodiments, the microphone that is being utilized to capture sound is the microphone that is on the hearing prostheses, such as the microphone 126 on the BTE device. In some embodiments, the microphone that is being utilized to capture sound is a remote microphone. In some instances, the microphone can be the microphone of the smart phone. In other instances, the microphone is a dedicated remote microphone that is in wireless communication (e.g., RF wireless) with the hearing prosthesis. In some instances, the system is configured such that the sound processor can rely on inputs from a plurality of microphones, such as any two or more microphones detailed herein. In an exemplary embodiment, the sound processor of the system can compare sound inputs from multiple different sources, simultaneously, and utilize one over the other(s) based on a determination that one signal has more utilitarian value over the other(s) and/or utilize both signals to create a blended signal that has the best features from the signals (e.g., utilize one signal for certain frequencies and utilize other signals for other frequencies). Two processor could be relying on a comparison between sound inputs from multiple different sources simultaneously In an exemplary embodiment, the system can be configured so that the processor processes algorithms that are based on statistical data related to microphone placement, and the processor can determine based on the received signal utilizing these algorithms, that the microphone can be oriented or otherwise placed at a different location to improve the hearing percept of the recipient. In some instances, the determination is made that the recipient should place the remote microphone closer to the speaker and/or should rotate the microphone towards the speaker and/or away from the recipient.

In view of this, in an exemplary embodiment, the system is configured to analyze the received signal to develop data relating to at least microphone placement, and the output signal results in the system providing an indication of a microphone. This indication can correspond to any of the indications detailed above as modified to indicate the instruction relating to microphone placement and/or microphone orientation. Different color LEDs can be utilized, arrows can be utilized that indicate an action to be taken/that should be taken. In some embodiments, an audio signal is provided to the recipient utilizing the prostheses. In at least some exemplary embodiments, these instructions are presented on a screen of the smart phone and/or the smart watch. With respect to some such embodiments, consistent with the above, it can be seen that the system can include a hearing prosthesis and a smart device including an interactive display screen remote from the hearing prosthesis. The system can be configured to display the instructions thereon. That said, in some embodiments, the system is also configured to display, on the interactive display screen, one or more controls of the hearing prosthesis. While some embodiments do not include such functionality, in some other embodiments, the smart device is configured to enable the recipient to input controls therein to control the hearing prosthesis. By way of example only and not by way of limitation, in an exemplary embodiment, the touchscreen of the smart phone can include graphics for a volume control, a gain control, a noise cancellation system control, etc.

In view of the above, it can be seen that in an exemplary embodiment there is a portable electronic device, such as a smart phone, a smart watch, or an expanded remote microphone apparatus, or a dedicated consumer electronics device, comprising a visual indicator device and a wireless communication device, wherein the portable electronic device is configured to display instructions in an interactive format, which instructions are to people in visual range of the visual indicator to take actions to enhance future sensory input of a recipient of a sensory prosthesis. This interactive format can be as a result of a recipient providing input thereto from his or her prosthesis and/or via his or her smart phone or smart watch, etc., or any other manner that can enable the teachings herein. This interactive format can be as a result of another member of the conversation providing such input (e.g., via his or her smart phone/watch, etc.).

It is also noted that in at least some exemplary embodiments, an indication can be provided by the system that the recipient should utilize one or more additional microphones or otherwise not utilize one or more microphones that are currently being utilized in order to enhance the hearing percept of the recipient.

In view of the above, it is to be understood that in at least some exemplary embodiments, the system is configured to provide instructions to the recipient as to how to point the microphone/which way the microphone should be pointed, and/or where to place the microphone, all based on the analysis. There can be utilitarian value with respect to this because the system affirmatively tells the recipient what to do. Again, in some embodiments, the system can be configured to automatically evoke a hearing percept that cannot be heard by anyone else other than the recipient providing such instructions.

Note also that in some embodiments, the instructions can be to the recipient to adjust a sensitivity of a given microphone and/or that one microphone should be used instead of another. For example, in an exemplary embodiment, the system, based on the analysis, can determine that the remote microphone is not providing as much utilitarian value with respect to the microphone that is part of the prostheses, such as the microphone on the BTE device. The system can instruct the recipient as to which microphone to use. Note also, in at least some exemplary embodiments, the system can make adjustments automatically and then prompt the recipient or user or other party associated or otherwise impacted with the adjustments, to confirm the changes. That said, in an embodiment, the system can prompt a "warning" that it is planning to execute a change or otherwise an adjustment to the system unless an override is provided.

Figure 7A:
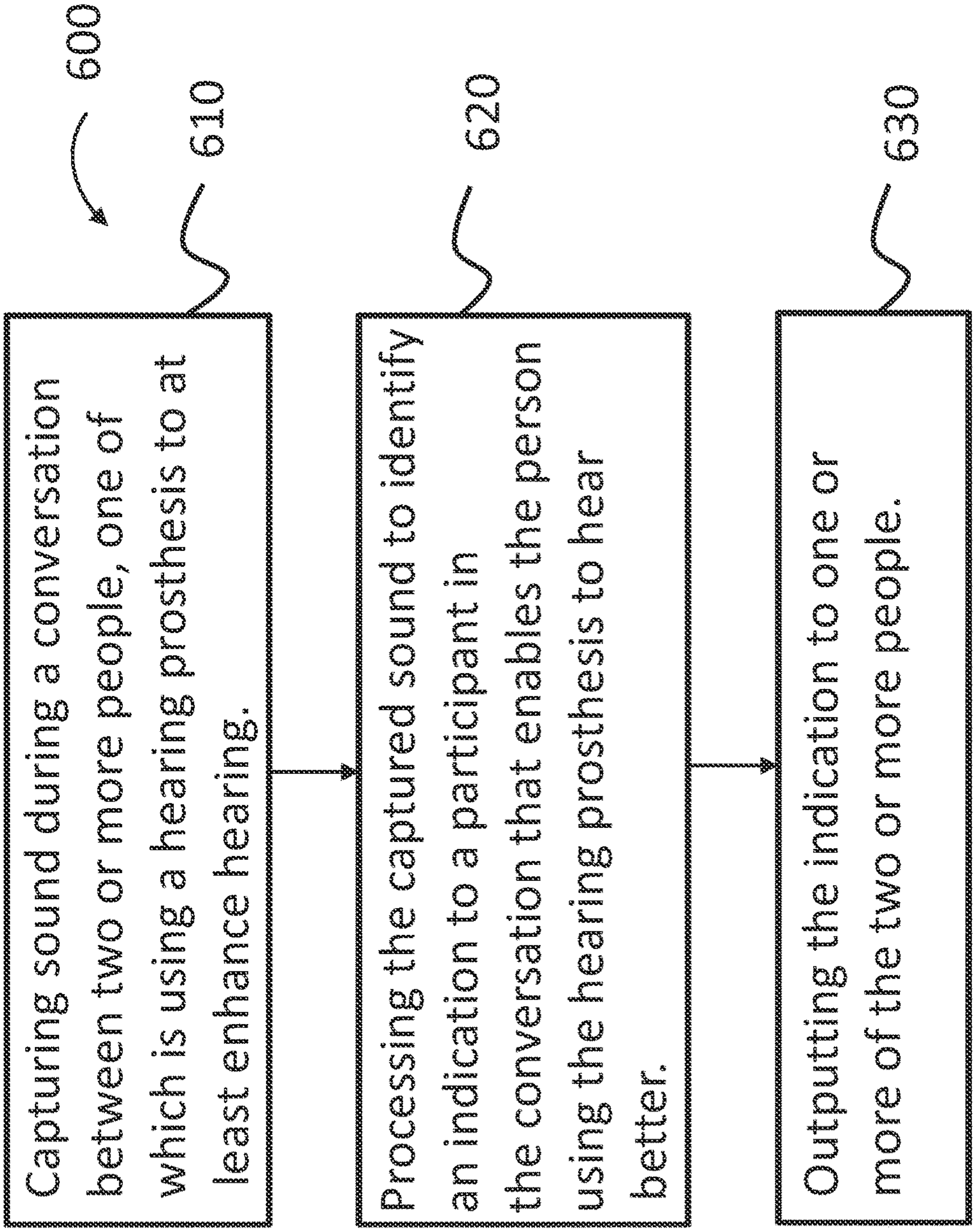
FIGS. 7A-13 present exemplary algorithms according to exemplary methods.

In view of the above, it can be understood that at least some exemplary embodiments include methods. To this end, FIG. 7A presents an exemplary flowchart for a method, method 600, according to an exemplary embodiment. Method 600 includes method action 610, which includes capturing sound during a conversation between two or more people, one of which is utilizing a hearing prosthesis to at least enhance hearing. By way of example only and not by way of limitation, the hearing prosthesis can be a cochlear implant, or a middle ear implant or a bone conduction implant device or can be a conventional acoustic hearing aid in some embodiments. Method 600 further includes method action 620, which includes processing the captured sound to identify an indication to a participant in the conversation that enables the person utilizing the hearing prosthesis to hear better. Such action can correspond to any of the actions detailed above, or any other action that can enable the person utilizing the hearing prosthesis to hear better. These indications can be pre-programmed into the processor or to the system detailed above or any other device. The indications can be present on a lookup table stored in memory in the system, where the aforementioned processor is configured to access such. In an exemplary embodiment, the processor compares one or more features of the captured sound to one or more data points in the lookup table, and if there is a correlation between the two, the indicator for such data point is selected. Method 600 further includes method action 630, which includes outputting the indication to one or more of the two or more people. The action of outputting the indications one or more of the two or more people can correspond to any of the outputs detailed above, or any other manner that can have utilitarian value with respect to implementing the teachings detailed herein.

Consistent with the teachings detailed above, method action 630 can be executed such that the indication is an instruction to a participant in the conversation other than the person utilizing the hearing prosthesis. Still further consistent with the teachings detailed above, that action 630 can be executed such that the indication is an instruction to the recipient utilizing the hearing prosthesis. In some instances, method action 630 is executed to the exclusion of one or more of the parties to the conversation, such as by way of example only and not by way of limitation, such that the people other than the recipient do not receive the instruction or such that the people other than the recipient are the only ones to receive the instruction. Still further, one or more of the people who are not the recipient can be excluded from the pool of non-recipient peoples in the embodiment where the instruction is provided to people other than the recipient, such as by only illuminating LEDs that can be seen by some people, and not others, or by providing a text message to smart phones of only some of the people, etc.

Still, in at least some exemplary embodiments, method action 630 is executed such that the indication is provided to all members of the conversation. In an exemplary embodiment, method action 630 is executed so that all see the indication, where the indication is a visual indicator. In some exemplary embodiments, method action 630 is executed in a manner that distracts one or more of the speakers of the conversation and/or does not inform one or more speakers of the conversation, such as by way of example only and not by way of limitation, the recipient of the hearing prosthesis or the speaker speaking to the recipient. To be clear, in some embodiments, the indication is provided to all parties in the conversation, while in other embodiments, the indication is only provided to some of them (e.g., only the speaker, only the person with the hearing prosthesis, only people other than the hearing prosthesis, including all such people etc.). In some embodiments, the indication distracts all parties to the conversation, while in other embodiments, the indication distracts only one or more of the parties (e.g., only the speaker, only the person with the hearing prosthesis, only people other than the hearing prosthesis, including all such people etc.).

Figure 13:
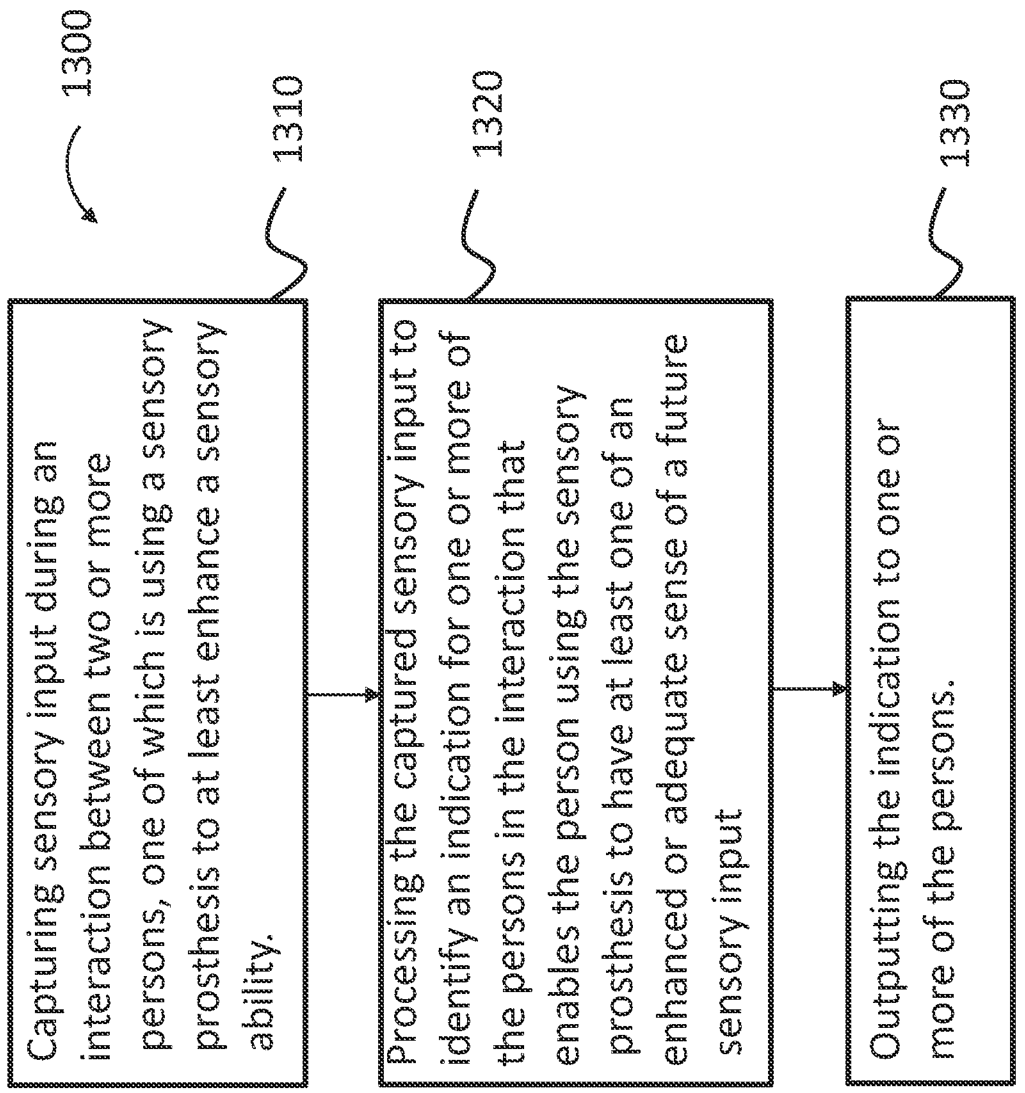

It is noted that a variation of method 600 is presented in FIG. 13, method 1300, which includes method action 1310, which includes the action of capturing sensory input during an interaction between two or more persons, one of which is using a sensory prosthesis to at least enhance a sensory ability, consistent with the teachings above. Method 1300 further includes processing the captured sensory input to identify an indication for one or more of the persons in the interaction that enables the person using the sensory prosthesis to have at least one of an enhanced or adequate sense of a future sensory input, as seen in block 1320. The future sensory input can be part of the same conversation that spawned the original sensory input associated with method action 1310. Method 1300 also includes method action 1330, which includes outputting the indication for the one or more of the persons. Method 1300 can be implemented according to any of the teachings herein.

In an exemplary embodiment, as noted above, the indication of method action 630 is an indication that is an instruction. In an exemplary embodiment, this can be an instruction to a participant in the conversation other than the person utilizing the hearing prosthesis. In an exemplary embodiment, this can be an instruction to the persons in the conversation other than the person utilizing the hearing prosthesis to speak differently. In keeping with the automated nature of the system detailed above, in this exemplary embodiment, the instruction is not directly prompted by the person utilizing hearing prosthesis. That is, in at least some exemplary embodiments, the recipient has no input into the prompting of the instruction. That is not to say that the recipient does not activate the system, that is simply not a direct prompt. All automatic systems must be activated by a human in some fashion or another, for the automation to be executed. Note further that in at least some exemplary embodiments, the instruction is not directly prompted by any party to the conversation. Note further that the instruction is not indirectly prompted by any party of the conversation in some other embodiments as well.

Note also that in some alternate embodiments, the indicators are actually directly prompted by the recipient of the hearing prosthesis. In this exemplary embodiment, such can have utilitarian value with respect to a scenario where the recipient wants control over the indications, but does not want to overtly interrupt the conversation, such as by saying, "cannot hear you," or "can you speak louder." In this exemplary embodiment, the recipient has the ability to control the system to output the indications based on manual input.

In an exemplary embodiment, the systems are configured so as to enable the recipient to override the system in whole or in part, or otherwise prevent one or more or all of the indications from being provided in a scenario where, all other things being equal, such indications would be provided. In an exemplary embodiment, any of the devices detailed herein can be provided with an input suite or otherwise can be configured to receive input from the recipient, and are configured to, based on the received input, override one or more or all of the features of the system or otherwise override one or more or all of the activities of the system, such as prevent one or more of the indicators from being indicated. In an exemplary embodiment, the recipient's smart phone and/or the recipient's smart watch can be utilized as the inputs suite for override purposes. Thus, in some embodiments, there is a system as detailed herein where at least one of the components thereof (the prosthesis, the remote device, etc.) is configured to enable a recipient of the prosthesis to override and/or adjust one or more of the indications.

Briefly, it is noted that some embodiments include a prosthesis that is configured to adjust a functionality of the remote device unrelated to the indicator(s) detailed herein. By way of example, a feature of the remote microphone, or even a feature of the smart phone or smart watch.

Also, it is noted that in at least some exemplary embodiments, the remote display of a dedicated device of the system can be replicated, in part or in whole, or otherwise presented in a modified manner that still provides at least some of the information that is provided by the remote display, on a smart phone and/or a smart watch screen. In an exemplary embodiment, such can be used for control purpose to control one or more or all of the systems and/or subsystems detailed herein.

To be clear, in at least some exemplary embodiments, some or all of the teachings detailed herein are directed towards a system and method that frees the hearing prosthesis wearer from having to overtly interrupt or otherwise inject into the conversation that he or she is having difficulty hearing. Again, in at least some exemplary embodiments, the teachings can be implemented with respect to providing information on a display or otherwise via a device associated with one or more remote microphones. Any other device that can be manipulated or otherwise can be placed within grasping range of a recipient of the prosthesis can be utilized, again, such as a smart phone or the like. Also, it is noted that any such device, including the aforementioned remote microphone, can be combined or otherwise include control components that can enable control of one or more of devices associated with the system, where, in some embodiments, the control can enable the recipient to override or otherwise minimize the information being provided via implementation of the teachings detailed herein.

In an exemplary embodiment, all parties to the conversation understand what is going on with respect to the teachings detailed herein. Conversely, in another exemplary embodiment, it is only the recipient who understands that the system is being utilized and otherwise knows what is going on. In one or both of these embodiments, the teachings detailed herein can provide feedback for the recipient. The feedback can indicate that it is the recipient who is having the problem, and/or that it is the device that is causing the problem (in which case the device should be altered, such as a volume control should be adjusted and/or a noise cancellation system should be engaged or disengaged, etc.).

That said, other discrete detectors can be utilized, such as by way of example only and not by way of limitation, the recipient simply tapping or otherwise touching the screen of his or her smart phone and/or smart watch. By way of example only and not by way of limitation, the smart phone screen with the smartwatch screen can be divided into two or four (or more) sections that may or may not be visible on the screen, where a recipient can tap one of those sections in a discreet manner without even looking at the phone, so that the smart phone can send a signal to the system to output the indicator, which will be received by the recipient e.g., the smart phone can be in signal communication with the BTE device, and the area of the screen that the recipient tapped results in an LED illuminating at a certain color, which indication is known by the speaker to mean something thereto. This concept can also be extended to the smartwatch or the like. Note also that in some instances, it can be the number of taps as opposed to the location that is tapped, that controls the type of indication (one tap means to speak louder, and thus the LED on the ear hook facing the speaker illuminates in red, two tabs means to speak slower, and thus the LED one ear hook facing the speaker illuminates in yellow, etc.).

It is noted that in some embodiments, method action 630 is such that the indication is instruction information, as noted above. Conversely, in some exemplary embodiments, the indication is non-instruction information. By way of example only and not by way of limitation, whereas instruction information can correspond to an affirmative command to do something, non-instruction information can correspond to simply providing information relating to the given scenario. By way of example only and not by way of limitation, the indication can be that the speaker is speaking to low or too fast. Still further by way of example only and not by way of limitation, the indication can be that the microphone placement is not optimized or otherwise that the microphone can be moved to a better location. For example, the indication can be that the microphone can be turned 20° to capture the speaker to the right of the microphone's voice better. The recipient may or may not want to adjust the microphone position to capture the speaker to the right of the microphone's voice better if the speaker to the left of the microphone is also saying things that the speaker might want to hear at least as equally as the other speaker or otherwise is speaking in a manner that is less clear than the speaker to the left, and thus warrants the positioning of the microphone so that it better captures the speaker to the left's voice than the speaker to the right's voice.

To further expand some of the teachings above, and to provide for a specific example of the utilization of some of the teachings above, it is noted that in an exemplary embodiment, the system can utilize different indicators to relate to speech versus microphone placement. In some embodiments, three separate instructions could potentially be provided at the exact same time. (Note that in some embodiments, more than three separate instructions can be provided at the same time, or two separate instructions can be provided at the same time.) In an exemplary embodiment, the text screen can provide two or three or four more instructions at the same time.

With respect to background noise, in an exemplary embodiment, such relates to an instruction related to data relating to a recipient of a hearing prosthesis. In this regard, in an exemplary embodiment, if the system determines that the background noise is interfering with the sound processing of the prosthesis, an instruction can be provided by the system indicating that the recipient should move to an area where there is less background noise. The instruction can be provided by the system indicating that the recipient or someone else should remove a given noise, current off a device that is creating noise, etc. In an exemplary embodiment, the system can be configured to provide an instruction that one or more of the microphone should be deactivated and/or that the sensitivity of one or more the microphones should be adjusted and/or that the amplification of output from one or more microphones should be adjusted to accommodate or otherwise account for the noise. Still further, in an exemplary embodiment, the system can be configured to automatically deactivate or otherwise make one or more the aforementioned adjustments to the one or more microphones in a scenario where the system determines that the background noise is interfering with a sound processing of the prosthesis.

It is noted that many other scenarios can be envisioned with regard to instructions related to data relating to a recipient of the hearing prosthesis, such as potentially electromagnetic interference with the wireless system of the prosthesis.

Thus, in an exemplary embodiment, the indication of method action 630 indicates that one or more features in an ambient environment are deleterious to an optimum hearing percept by the person using the hearing prosthesis. Such an indication includes implicit indications, such as that certain actions can be taken to address the deleterious situation even if the deleterious situation is not specifically identified. By way of example only and not by way of limitation, an indication can correspond to a statement that "reducing background noise can help you hear."

In some exemplary embodiments, the indication of method action 630 is an indication that a sensitivity of a sound capture apparatus remote from the hearing prosthesis, such as by way of example only and not by way of limitation, a remote microphone, whether that be a dedicated remote microphone, and/or a remote microphone that is part of a portable consumer electronics product, such as a smartwatch or a smart phone, can be adjusted and/or that another sound capture apparatus can be used to improve hearing by the person utilizing the hearing prostheses. By way of example only and not by way of limitation, with respect to the latter, such can include an indication that the recipient should utilize the remote microphone that is in wireless communication or otherwise can be placed into wireless communication with the hearing prosthesis, instead of utilizing the dedicated microphone of the prosthesis, such as the microphone on the BTE device. In an exemplary embodiment, again with respect to the latter, this can include an indication instructing one or more parties to speak into a microphone of a smart phone or a smartwatch, which smart phone or smartwatch is in signal communication with the hearing prosthesis.

With respect to the former, such an indication can be provided while the recipient is utilizing that sound capture apparatus remote from the hearing prosthesis. This can be done with respect to a scenario where the recipient is utilizing the dedicated remote microphone, such as where the recipient has handed the remote microphone to one of the speakers and/or has placed the remote microphone on a table near speaker so that the sound capture apparatus can better capture the sound of the speaker.

Consistent with at least some of the exemplary embodiments detailed above, the output regarding the captured sound can be an indication that a source of noise is present that deleteriously affects a hearing percept of another sound. By way of example only and not by way of limitation, the multiuse smart portable device can be configured with a memory that includes data indicative of sound spectrums of different noises, such as by way of example only and not by way of limitation, a motorcycle engine revving, a leaf blower, a jackhammer, etc., which sounds have been previously identified as sounds they can have a deleterious effect on another sound. In an exemplary embodiment, the multiuse smart portable device is configured to compare the incoming sound to the data indicative of the sound spectrums, which sound spectrums can be located on a lookup table or the like, and make a determination that there exists a sound that has the deleterious effect. For example, sounds that have been identified as having a deleterious effect can be catalogued as such, and the algorithms(s) utilized by the multiuse smart portable device is configured to output an indication upon correlation between the incoming sound and the catalog sounds.

Consistent with the teachings detailed above, the output regarding the captured sound that is output from the multiuse smart portable device can be a visual indicator. This can be a visual indication on the display of the smart portable device, which can indicate at least one of that the person in sight distance of the display (e.g., any party to the conversation that can see the display, which could be all of the people in a conversation in a scenario where, for example, the smart portable device was placed onto a tabletop) should take action, a person in sight distance of the display is acting in a utilitarian manner (e.g., the display could indicate that the speaker should continue to speak the way they have been speaking or otherwise currently speaking) or a characteristic of the ambient environment.

Note that some embodiments can bifurcate or trifurcate or quadrifurcate the display so that the indicator is reproduced multiple times in an orientation that can be read or otherwise evaluated by two or more people that are angularly distant relative to one another. By way of example only and not by way of limitation, in a scenario where two people are sitting at a table 180° opposite one another, the recipient could put the smart portable device onto the table at a location where both can see the display. The smart portable device can have programming such as in the form of an application thereon that can enable the recipient to activate a conversation application that executes one or more of the methods detailed herein, and bifurcates the screen so that the top of the screen (e.g. the portion of the screen away from the recipient) presents characters that are upside down relative to the recipient, but right side up relative to the person to whom the recipient is speaking, and the bottom of the screen (e.g., the portion of the screen closest to the recipient) presents characters that are right side up relative to the recipient, but upside down relative to the person to the recipient is speaking. Thus, in an exemplary embodiment, such as by way of example only and not by way of limitation, where the multiuse smart portable device provides a visual indicator of a characteristic of the ambient environment, the words "loud music" can be displayed right side up and upside down on the screen simultaneously, so both the recipient and the person to whom the recipient is speaking can read those words (this exemplary scenario is executed with a system that is configured to identify music utilizing the aforementioned sound analyzers or other techniques, and determine whether or not the music is relatively loud, such as having a volume that can have a deleterious effect on the evocation of a hearing percept of speech).

Note also that the above exemplary embodiment can be executed in a more simplified manner, such as where the screen is divided into two or three or four or five or six or more sections (e.g., a square pie chart), and the various sections are illuminated with a red or yellow or green light depending on a given scenario. For example, in a scenario where, for example, a cochlear implant user is playing poker (money-based poker) with five other players, all generally equidistant around a circular table, the smart phone can display on the screen five different sections or 6 different sections (if the multiuse smart portable device is also going to be used to analyze the recipient's speech) each section generally pointed or otherwise aligned with a given player. In a given scenario where everyone is speaking in a utilitarian manner, all five or six different sections will be illuminated green. If one of the speakers is speaking fast, and the multiuse smart portable device determines that such is the case, that section of the screen can turn yellow, whereas all the other sections will remain green. Still further, if someone else is speaking in a very soft manner, that other section can also turn red, while all the other section say the yellow section remain green.

Of course, the embodiments detailed above have been directed towards scenarios where the multiuse smart portable device is being used during a conversation with someone who is utilizing a hearing prosthesis. In this regard, in at least some exemplary embodiments, the multiuse smart portable device is configured to receive input indicative of a presence of a person utilizing a hearing prosthesis, which presents is at least within sight and/or within intelligible speech distance of the portable device. In an exemplary embodiment, the device is configured to indicate to the person that he or she is and/or is not speaking in a given utilitarian manner.

Figure 7B:
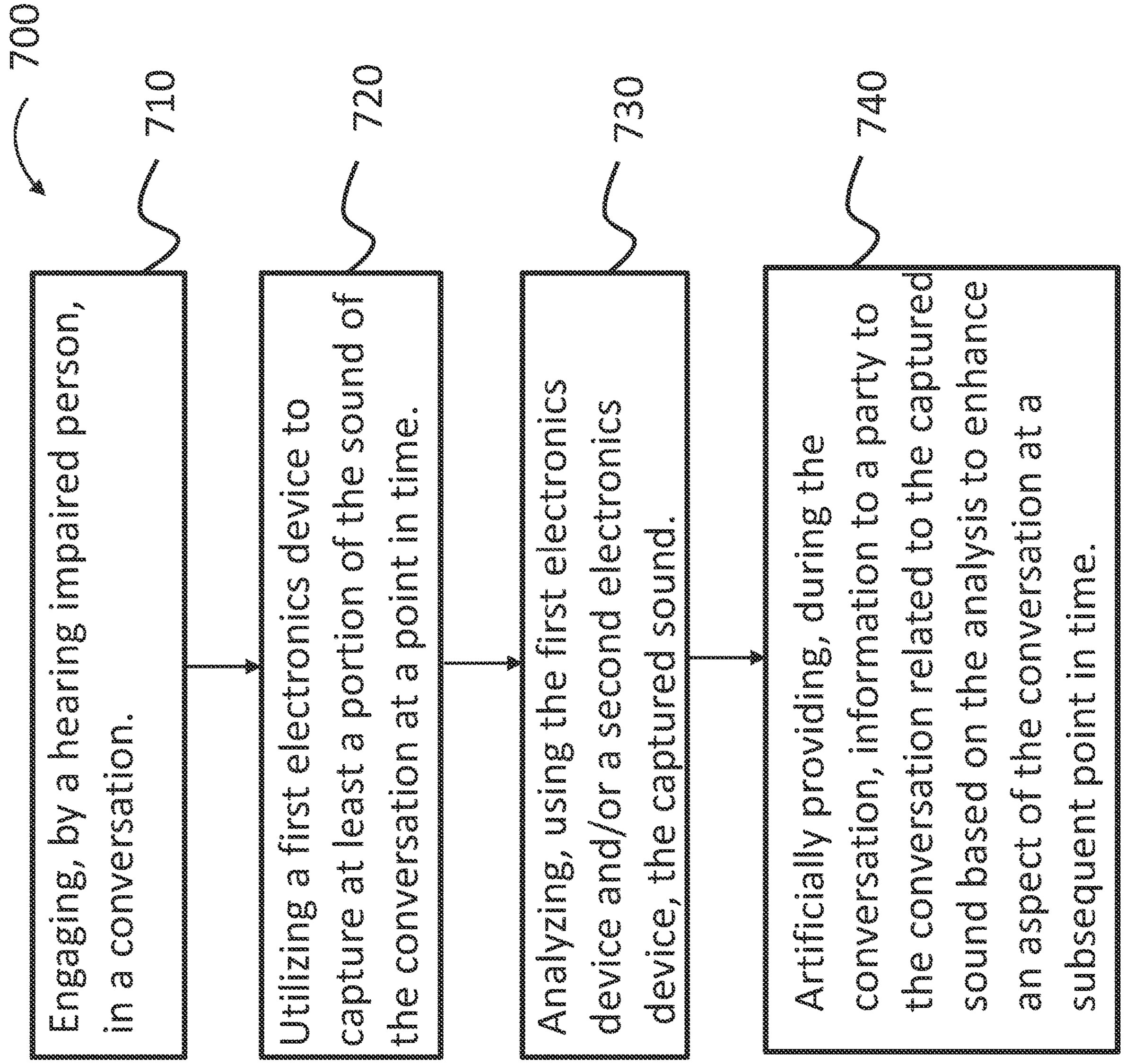

FIG. 7B presents an exemplary algorithm for an exemplary method, method 700. Method 700 includes method action 710, which includes the action of engaging, by a hearing impaired person, in a conversation. In an exemplary embodiment, the hearing impaired person is a person who utilizes a hearing prosthesis. Method 700 further includes method action 720, which includes utilizing a first electronic device to capture at least a portion of the conversation at a point in time. In an exemplary embodiment, this can correspond to the utilization of the microphones on the BTE device or on an OTE sound processor or the like. In another exemplary embodiment, this can correspond to utilizing a remote microphone that is specific to the prosthesis. In another exemplary embodiment, this can correspond to utilizing a microphone of the smartwatch or the smart phone or another type of consumer electronics device that includes a microphone. Method 700 further includes method action 730, which includes analyzing, using the first electronics device and/or a second electronic device, the captured sound. In an exemplary embodiment, such as where the analysis occurs utilizing the prosthesis that is configured to execute one or more of the method actions detailed above, a processor in the prosthesis executes method action 730, and if method action 720 was executed utilizing the prostheses to capture the sound, the first device is utilized to execute method 730. If however, the captured sound which is captured by the prosthesis is wirelessly provided, for example, to the multiuse smart portable device, such as the smart phone, and the smart phone analyzes the captured sound, method action 730 is executed utilizing a second electronics device. Accordingly, in an exemplary embodiment, the first electronics device is a hearing prosthesis worn by the hearing impaired person, and the action of analyzing the captured sound is executed using the second electronics device, wherein the second electronics device is a portable smart device. In this exemplary embodiment, the first electronics device provides a wireless signal to the second electronics device based on the captured sound (e.g., the BTE device or other part of the hearing prosthesis provides an RF signal to the smart phone, which RF signal is based upon the captured sound), and the second electronics device analyses the signal in the action of analyzing of method action 730 (e.g., utilizing the onboard processor of the smart phone to analyze the signal in accordance with the teachings detailed above are variations thereof).

Still further, in an exemplary embodiment, the captured sound can be the sound captured by, for example, the microphone of the portable smart device and the first electronic device can be thus a portable smart device. In any event, method 700 further includes method action 740, which includes artificially providing, during the conversation, information to a party to the conversation related to the captured sound based on the analysis. By artificially providing, it is meant that this is not executed in a natural manner by a human or the like. Instead, the information is provided via artificial means, such as via an indicator on a BTE device as detailed above, or a text based message on the display screen of the smart phone or the smartwatch, etc.

In an exemplary embodiment, the information provided to the party to the conversation can be any of the information detailed above are variations thereof.

In an exemplary embodiment of the method of 700, method action 740 includes automatically providing a visual indicator to the party utilizing a device remote from the party upon a certain result of the analyzing. In an exemplary embodiment, the device can be a smart phone which is located on a table, by way of example. In an exemplary embodiment, the device can be a smartwatch which has been taken off the wrist of the recipient or another party, and placed on a table, by way of example, in another exemplary embodiment, the device can be a dedicated device that executes method 700, which device does nothing else other than execute the teachings detailed herein and/or variations thereof. Conversely, in an exemplary embodiment, method action 740 includes providing a visual indication to the party utilizing a device worn and/or held by the party.

In an exemplary embodiment of the former, such can be executed utilizing a smartwatch or an LED indicator on the BTE by way of example. With respect to the latter, such can be executed utilizing a smart phone or a smartwatch that is held in the hand of the recipient. Thus, in an exemplary embodiment where the first electronics device can be the BTE device and the second electronics device can be the smart phone, in at least some exemplary embodiments, method action 740 includes utilizing the second electronics device (smartphone) to artificially provide information to the party to the conversation, and in some instances, method action 740 includes artificially providing, during the conversation, information to a party to the conversation related to the captured sound based on the analysis to enhance an aspect of the conversation at a subsequent point in time In an exemplary embodiment, the first electronics device is a hearing prosthesis worn by the hearing impaired person, and method action 730 is executed utilizing a second electronics device different from the first electronics device, such as by way of example only and not by way of limitation, a portable smart phone or a remote processor in signal communication with the prosthesis via a server, which server can be in signal communication with the prosthesis via a Bluetooth system. By way of example only and not by way of limitation, in an exemplary embodiment of this exemplary embodiment, there is the additional action of providing via the first electronics device (e.g., in this example, hearing prosthesis) and/or via the second electronics device (e.g., the smart phone and/or the server processor combination), a wireless signal to a third electronics device instructing the third electronics device to execute the action of artificially providing information to the party to the conversation (execute method 740). By way of example only and not by way of limitation, the third electronics device can be a smartwatch or some other accessory different than the first and second electronics device. Note that in the exemplary embodiment where the first electronics device provides the wireless signal, such can be the case in an exemplary embodiment where the remote server is in signal communication with the hearing prosthesis, and the hearing prosthesis receives the results of the analysis and then provides a signal to a third electronics device that results in that third electronics device providing the indication. Conversely, in an exemplary embodiment where the processing is executed by a smart phone, the symbiotic relationship between the smart phone and the smartwatch can be relied upon to have the smartwatch execute method action 740.

In some embodiments, such as where there is a first electronics device that is a hearing prosthesis worn by the hearing impaired person, there is an action of analyzing captured sound that is executed using the first electronics device. Also, in an exemplary embodiment, there is an action of artificially providing information to a party to the conversation that is executed by the first electronics device, all consistent with the embodiment detailed above where the hearing prostheses includes indicators. Thus, in this exemplary embodiment, the party to the conversation can be a person other than the recipient of the hearing prosthesis. That said, in at least some exemplary embodiments, the party to the conversation can be the person who has the hearing prosthesis, in accordance with the teachings detailed above. Still further, action 740 is not mutually exclusive between the person with the hearing prosthesis and the person without the hearing prostheses: a method action can be executed simultaneously with method action 740 such that the information goes to both people or both types of people, where, for example, there is more than one person in the conversation who does not have the hearing prosthesis.

In at least some exemplary embodiments of the method 700, the information of method action 740 is information that is specific to non-conversation related sounds. By way of example only and not by way of limitation, the information can be regarding background sound or wind noise etc. The information can be an indication that there is considerable background noise and/or that there is considerable wind noise, etc.

Embodiments detailed above have generally focused on there being only one component that provides the information/provides the instructions it is noted that in some exemplary embodiments, there can be a system that includes two or more such components. In an exemplary embodiment, by way of example only and not by way of limitation, both the prosthesis and the multiuse smart portable device can provide indicators/instructions/information. Note further that in some embodiments, there can be a plurality of multiuse smart portable devices as well (more on this below). In some exemplary embodiments, there can be a prosthesis, one or more multiuse smart portable devices, and one or more non-multiuse smart portable devices, such as a device dedicated to do one or more the method actions here and nothing else. Note also that in at least some exemplary embodiments, a plurality of hearing prostheses can be present, where one prosthesis can communicate with the other prosthesis in a manner the same as or otherwise analogous to the communication between the remote device and the prosthesis. In some instances, one or more or all of the devices in the system provide the same indicators simultaneously or in a temporally spaced manner. In some instances, one or more or all of the devices in the system provide different indicators simultaneously or in a temporally spaced manner. In some instances, these indicators provided by the separate components are provided directly and/or only to a specific person who is part of the conversation. By way of example only and not by way of limitation, in an exemplary embodiment, prior to engaging in a conversation and/or during a conversation, one or more parties to the conversation download an application onto their multiuse smart portable devices that enables one or more or all of the method actions detailed herein. In an exemplary embodiment, these devices can be configured, such as by way of example, a brief request for information screen that asks whether or not the holder or the owner of the multiuse smart portable device is the person with the hearing prostheses or a speaker to the hearing prosthesis, etc. In an exemplary embodiment, the application can enable a multiuse smart portable device that is owned or otherwise possessed by a party to the conversation who is not a person with a hearing prosthesis to be placed into signal communication with the hearing prostheses and/or with the multiuse smart portable device that is being utilized by the person with the prosthesis so that the multiuse smart portable device owner otherwise possessed by the party who is not a person with a hearing prosthesis can execute one or more of the method actions herein. By way of example only and not by way of limitation, in an exemplary embodiment, such as where the action of analyzing the captured sound is executed utilizing a device that is in the possession or otherwise owned by the person having the prostheses, the first and/or second electronics device can provide a wireless signal to a third electronics device, so that that device outputs the information, which third electronics device is the portable device owned or otherwise possessed by the person without the hearing prostheses. That said, in an exemplary embodiment, the portable electronics device owned by the person who does not have the hearing prosthesis can operate independently of the other components just as is the case with respect to the multiuse smart portable device owned by the recipient or any other device owned by the recipient. Accordingly, in an exemplary embodiment, a scenario can exist where two or more separate smart phones and/or two or more separate smartwatch are independently providing information to their respective owners/process source in accordance with the teachings detailed herein.

Figure 8:
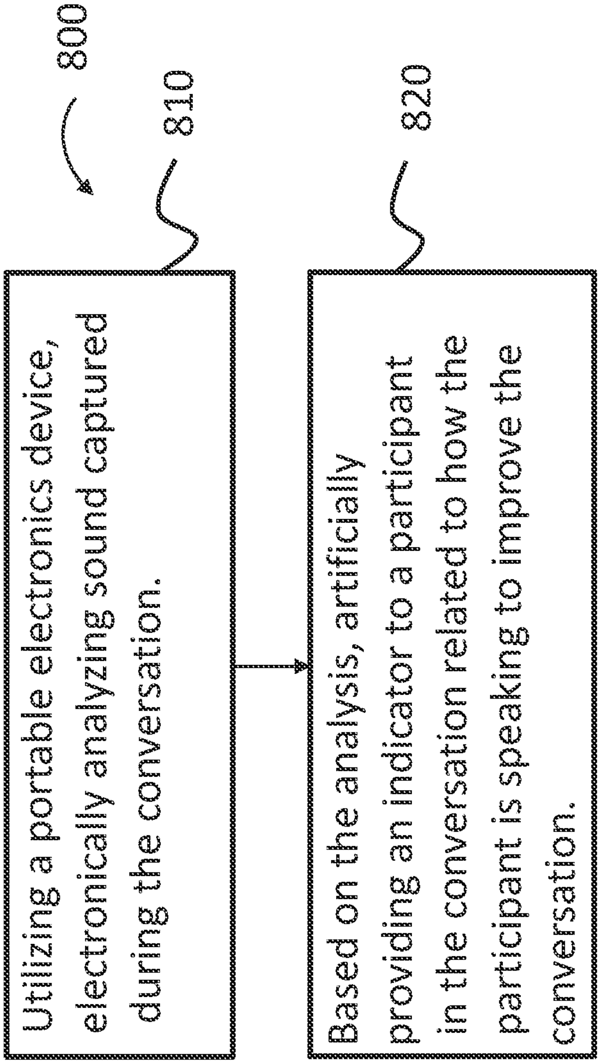

FIG. 8 presents an exemplary flowchart for an exemplary method, method 800, which is a method of managing a conversation, which includes method actions 810 and 820. In method 800, method action 810 includes utilizing a portable electronics device to electronically analyze sound captured during the conversation. Method action 820 includes artificially providing an indicator to a recipient in the conversation related to how the participant is speaking. A requirement of method action 820 is that this action be based on the analysis of method action 810. Another requirement of method action 820 is that this be done to improve the conversation, consistent with the teachings herein.

That said, alternatively and/or in addition to this, in an exemplary embodiment, method action 810 can include utilizing the prosthesis to analyze sound captured during the conversation. In an exemplary embodiment, there can be utilitarian value with respect to some embodiments where the prosthesis has additional "information" or capabilities beyond that which may be associated with the remote devices. Such can enable further refinements of the type of indicator, or even whether an indicator should be provided to a recipient in the conversation, relative to that which would otherwise be the case if the prosthesis was not being utilized to execute method action 810. By way of example only and not by way of limitation, the prosthesis may be configured with a sound classifier or other type of device that can classify input and/or output. Still further, in an exemplary embodiment, the prosthesis may be configured to obtain or otherwise receive input indicative of situational awareness. In an exemplary embodiment, the prosthesis can be configured to determine whether or not the recipient is utilizing the prosthesis in a manner that is paired with one or more remote devices. Moreover, in an exemplary embodiment, there can be utilitarian value with respect to some embodiments for reasons associated with the communication regime between the prosthesis and other components. By way of example only and not by way of limitation, in an exemplary embodiment, the prosthesis can be in signal communication with the remote microphone/mini-microphone. This as contrasted to, for example, the smart phone or the smartwatch, at least in some scenarios of use. The prosthesis can also be utilized to directly adjust the remote microphone simultaneously with the execution of one or more or all of the method actions associated with FIG. 8. In view of the above, in some embodiments, the prostheses detailed herein and others are configured to automatically determine that it is paired with the remote device and begin providing the input to the remote device due to the determination.

It is also noted that in at least some exemplary embodiments, the system is configured to analyze the state of the recipient or otherwise extrapolate a state of the recipient via latent variables or otherwise simply receive information indicative of a state of the recipient (such as by direct input from the recipient) and take actions based on the state of the recipient. By way of example only and not by way of limitation, a state of the recipient may be that the recipient is speaking, or that the recipient is purposely trying to not pay attention to a given conversation, and by way of example. The action that is taken based on the state of the recipient can be one that alters the instruction or even cancels the instruction or otherwise activates an instruction relative to that which would otherwise be the case. For example, if the system "recognizes" that the recipient is not really paying attention to the conversation (e.g., the recipient presses a button that indicates that the recipient does not care about what the people in the conversation are saying), the number of instructions or the level of instructions to the recipient and/or to the parties and the conversation would be relatively reduced if not eliminated, because what is being said is not important. Conversely, if the system recognizes that the recipient is attempting to pay relatively close conversation to the conversation, the number and/or types and/or level of instructions would increase relative to that which would otherwise be the case. Accordingly, in an exemplary embodiment, the system is configured to drive a display of information to the parties/drive the indications to the parties in a manner that has utilitarian value with respect to a given set of dynamics within a conversation, as opposed to simply treating each conversation as a generic event that the system should react to in a standard manner.

It is also noted that in at least some exemplary embodiments, the systems detailed herein can be sophisticated in that the systems can in fact identify specific features of an environment. By way of example only and not by way limitation, the system can determine that it is a specific television, for example, that should be adjusted some manner to enhance a conversation. Further, in an exemplary embodiment, the system can be configured to provide a specific adjustment to that specific feature in the environment. For example, the instruction can be to turn the television off. That said, in an exemplary embodiment, the instruction can be to adjust the volume of the television by a certain amount.

Moreover, in at least some exemplary embodiments, the system can be configured to actually control certain features in the environment. For example, via an internet of things, a portion of the system may be able to communicate with a television, a radio, etc., within the environment, and make adjustments thereto automatically. Alternatively, and/or in addition to this, in an exemplary embodiment, the system can be configured to communicate with such other equipment in the environment, and prompt equipment to display an indication to the user thereof that he or she should adjust that equipment, or at least ask the user thereof if he or she would mind adjusting that equipment, all in an effort to enhance the conversation according to the teachings detailed herein.

Figure 9:
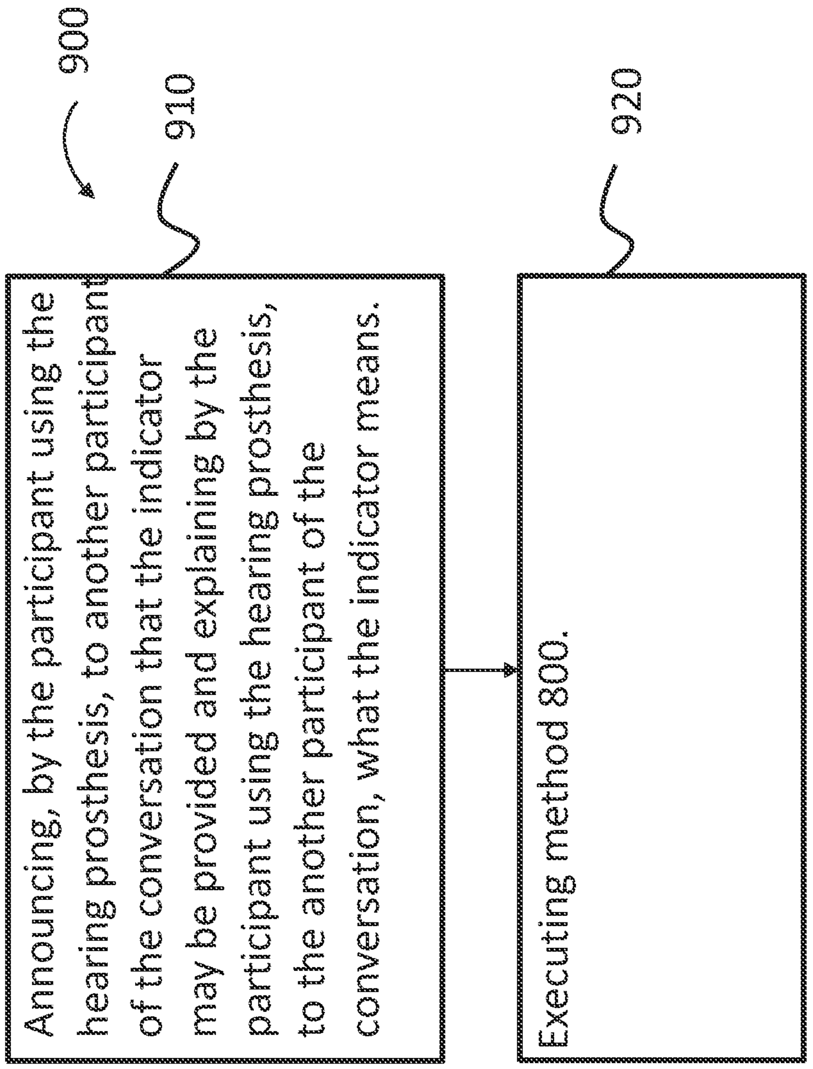

FIG. 9 presents an exemplary flowchart for an exemplary method, method 900. Method 900 includes method action 910, which includes announcing, by the participant using the hearing prosthesis of method 800, to another participant of the conversation that the indicator may be provided and explaining by the participant using the hearing prosthesis, to the another participant of the conversation, what the indicator means. By way of example only and not by way of limitation, in an exemplary embodiment, prior to engaging in the substance of the conversation, the recipient of the hearing prosthesis produces the multiuse smart portable device, or other device that is remote from the hearing prostheses that will be utilized to provide the indicators, and/or points to or otherwise identifies the indicators on the prosthesis, such as the LEDs on the ear hook facing the speaker. While doing this or after doing this or before doing this, the recipient explains what indicators will appear, what those indicators mean, and/or what the person speaking can do or otherwise should do or not do when such indicators occur. Of course, method 900 includes method action 920, which includes executing method 800. Again, as with all the methods detailed herein, the order of the method actions are not specific unless otherwise stated. In this regard, in an exemplary embodiment, method action 810 can be executed, at least partially, prior to method action 910. By way of example only and not by way of limitation, two people can engage in a conversation, and then the recipient might become fatigued, and then the teachings detailed herein can be implemented to reduce or otherwise lessen the impact of such fatigue. Still further, by way of example only and not by way of limitation, two people can engage in a conversation, and then the recipient can realize that the person speaking to him or her is speaking in a manner that not desired by the recipient subjectively and/or objectively (e.g., in a manner that is statistically undesirable), and thus can present the concepts detailed herein by executing method action 910, and then proceeding along with the conversation.

In an exemplary embodiment, method action 820 includes providing a visual indicator by the portable device, and the visual indicator can be a first light that indicates that a participant is speaking in an unsatisfactory manner. In an exemplary embodiment, the algorithm detailed above and variations thereof can be utilized to determine that this indication should be given.

In an exemplary embodiment, subsequent to the action of providing the first light, there is an action of capturing and analyzing sound captured during the conversation and providing a visual indicator in the form of a second, different type of light that indicates that the participant is speaking in a satisfactory manner. It is noted that in some embodiments, the physical structure of this light is the same light that corresponds to the first light, but this light can have a different feature, such as a different color, the light can be steady whereas the previous like can flash on and off, etc. That said, in some embodiments, the light can be a different physical structure entirely, such as a different LED entirely. In some embodiments, the indicator can indicate that the speaker is speaking in a utilitarianly satisfactory manner, and/or can simply indicate that the speaker speaking in a better manner, and that the recipient can speak even better. By way of example only and not by way of limitation, the first light might be red, and the second light might be yellow. A third subsequent light can be provided that would be green to indicate that the speaker speaking better than he or she was previously speaking.

Figure 10:
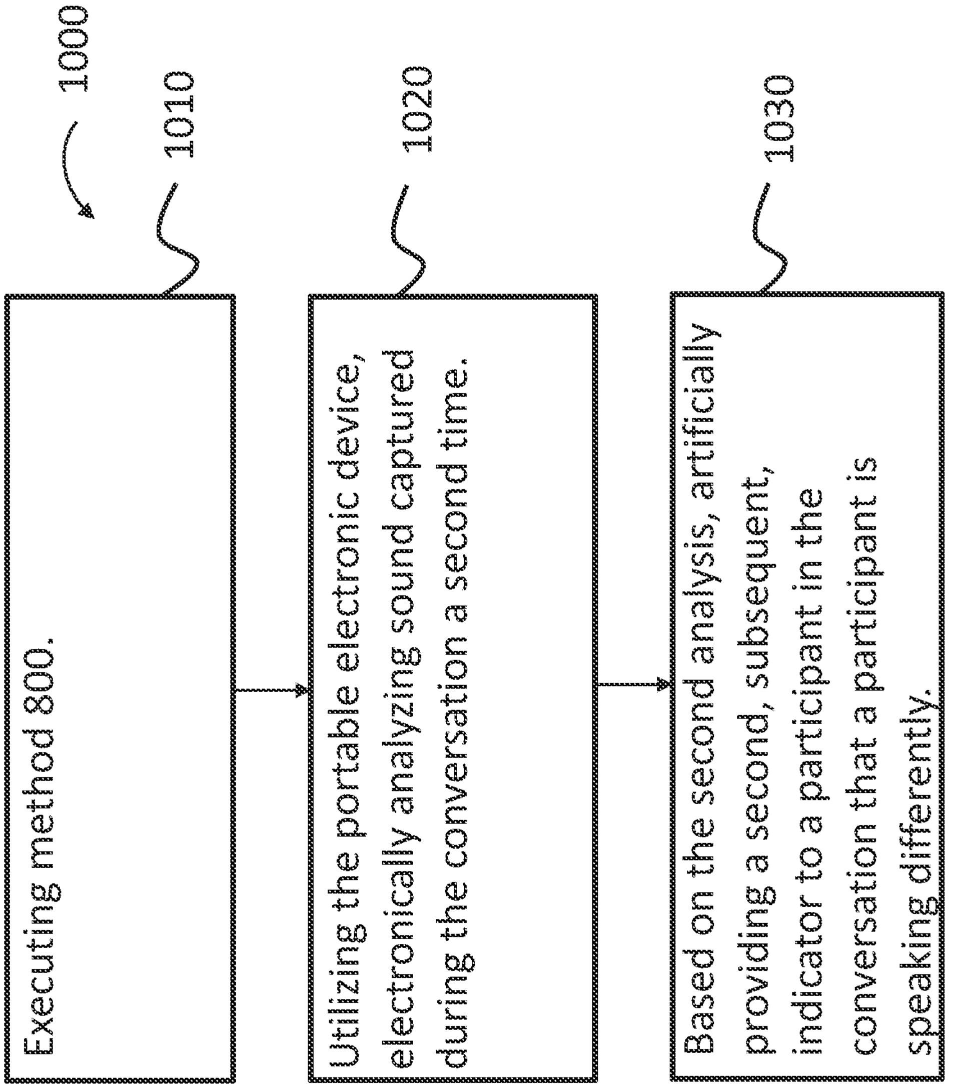

FIG. 10 presents an exemplary flowchart for another exemplary method, method 1000. Method 1000 includes method action 1010, which includes executing method 800. Method 1000 also includes method action 1020, which includes utilizing the portable electronics device to electronically analyze sound captured during the conversation a second time. In this embodiment, method action 1020 is executed after temporal progression from the first time that the sound was captured in method 800. In an exemplary embodiment, a temporal trigger can be utilized to trigger method action 1020. By way of example only and not by way of limitation, in an exemplary embodiment, the system can be configured to execute method action 1020 within one, two, three, four, five, six, seven, eight, nine, 10, 11, 12, 13, 14, 15, 20, 25, 30, 35, 40, 45, 50, 55, or 60 seconds from the previous analysis of the captured sound. That said, the analysis can occur continuously. Still further, the analysis can be such that the analysis entails capturing sound for a portion or all of the temporal period from the last time that sound was captured, and performing an analysis on some or all of that captured sound. In some embodiments, the algorithm utilized to perform the analysis is weighted towards the sound that was captured further temporally away from the sound that was previously captured, so as to take into account the possibility that the speaker has adjusted his or her speaking since the last indication, where the speaker may have better adjusted his speaking further away from the last indicator and/or the last timeit captured sounds.

Method 1000 further includes method action 1030, which includes, artificially providing a second, subsequent indicator to a participant in the conversation. In an exemplary embodiment, a requirement of method action 1030 is that such be done based on the second analysis of method action 1020. Further, in an exemplary embodiment, a requirement of method action 1030 is that the indicator be an indicator that the participant is speaking differently. That said, in at least some exemplary embodiments, there is a method action in between method action 1020 and 1030, which can include executing a derivative of method action 1030, except that the indicator is that the participant should improve his or her speaking, based on the analysis of action 1020. In an exemplary embodiment, subsequent to this, method 1000 can include executing a derivative of method action 1020, which can entail utilizing the portable electronics device, executing analyzing sound captured during the conversation a third time, where, after this, the method proceeds on to method action 1030, if a determination is made that the person is now speaking differently.

Figure 11:
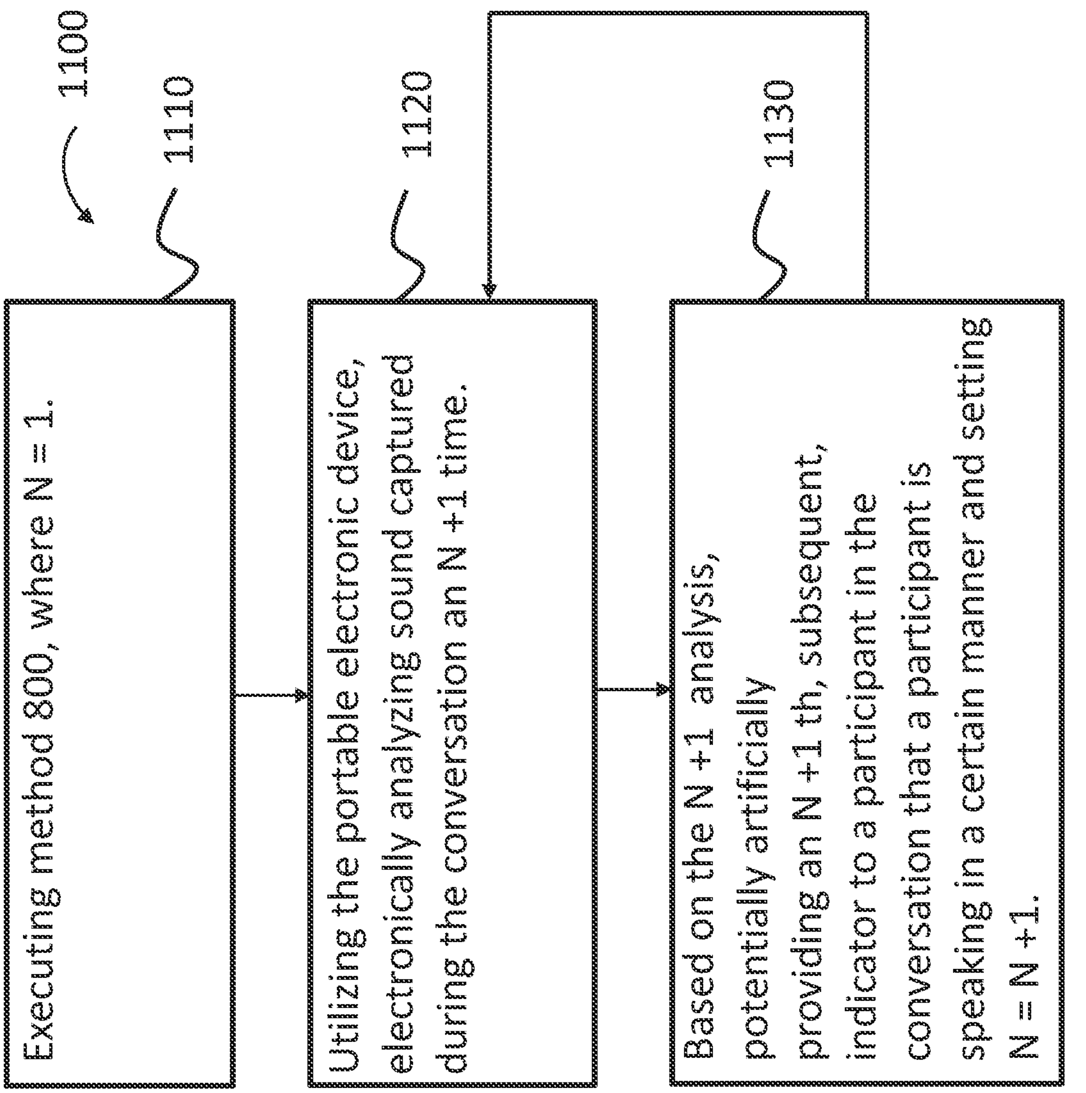

In view of the above variations of method 1000, it is to be understood that in at least some exemplary embodiments, variations of the method 1000 can be executed repeatedly and the outcome of those methods with respect to the indicator can be different each time based on the results of the analysis. In this regard, FIG. 11 presents an exemplary flowchart for an exemplary method, method 1000, which includes method action 1110, which includes executing method 800 for an N value equal to 1. Method 1000 further includes method action 1020, which includes utilizing the portable electronics device to electronically analyze sound captured during the conversation an N+1 time, which can correlate to a second time if N was the first time, a third time if N was the second time, etc. Method 1100 further includes method action 1130, which includes, based on the N+1 analysis, potentially artificially providing an N+1th indicator subsequent to the Nth indicator to a participant in the conversation that a participant is speaking in a certain manner. In this regard, it is noted that the word "potentially" is present in this method action. In some embodiments, such as where the system only provides an indicator when the participant is not speaking in a utilitarian manner, method action 1130 can result in such an indication or instructions to speak differently, whereas in such an embodiment, the system would not provide an indicator if the person was speaking in a utilitarian manner. That said, in some embodiments, such as where the system provides an indicator for all or most circumstances, such as when the speaker speaking in a utilitarian manner, such indication can be provided. In any event, in method action 1130, there is the action of setting N to equal N+1, and thus incrementing N to the next value. The method then goes back to method action 1120, where, for the new N value, method action 1120 is executed, followed by the execution of method action 1130 again for this new N value, and so on, until the system is shut down.

To be clear, consistent with the teachings detailed above, the indicator of the aforementioned method actions can be an indicator that the participant can speak differently to improve the conversation. Consistent with the teachings detailed above, the indicator can be an indicator that one or more of the participants is speaking to softly, or speaking too fast. In an exemplary embodiment, additional indicators and/or fewer indicators can be utilized, and in some embodiments, a plurality of indicators can be present at the same time.

Figure 12:
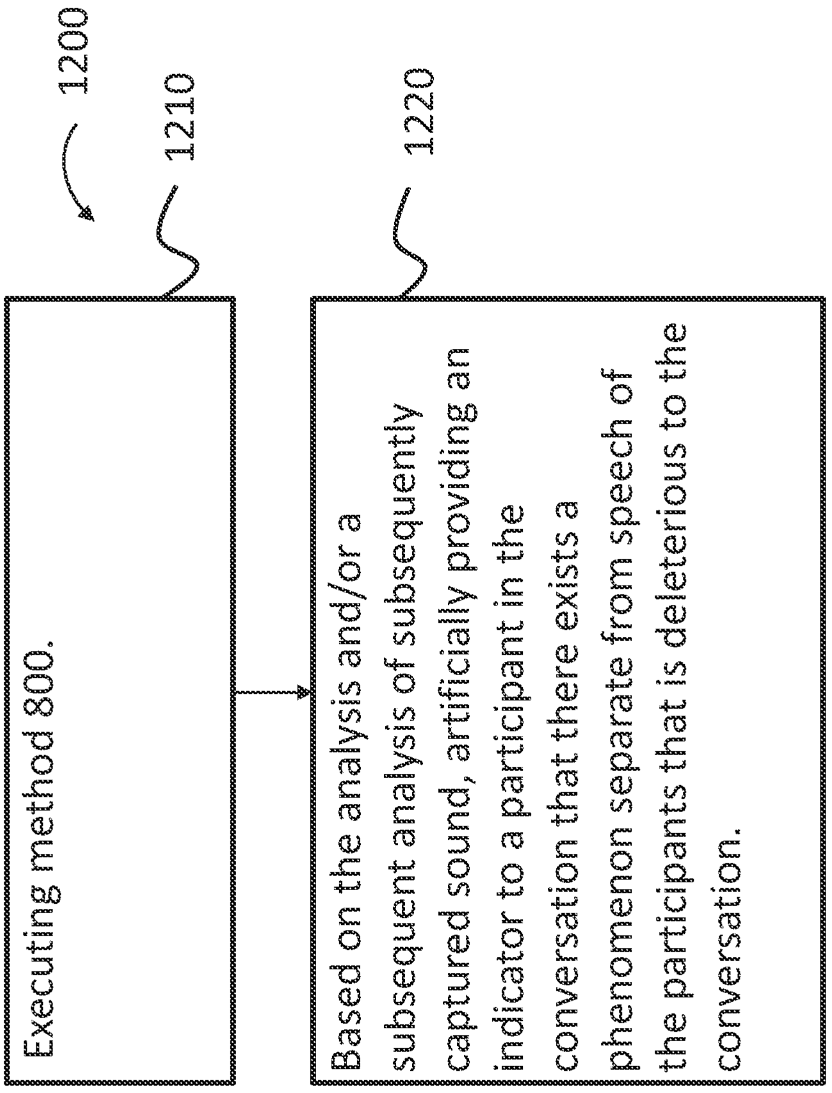

FIG. 12 presents an exemplary flowchart for an exemplary method, method 1200, which includes method action 1210, which includes executing method 800. Method 1200 further includes method action 1220, which includes the action of, based on the analysis (of method 800) and/or a subsequent analysis of subsequently captured sound (e.g., a scenario associated with method 1000 or method 1100), artificially providing an indicator to a participant in the conversation that there exists a phenomenon separate from speech of the participants that is deleterious to the conversation. Such method actions are, by way of example only and not by way of limitation, concomitant with the embodiments detailed above related to background noise. In at least some exemplary embodiments of this exemplary embodiment (the embodiment of method 1200), the indicator to a participant in the conversation that there exists a phenomenon that is deleterious to the conversation is an indicator of one or more of an ambient noise or a deficient microphone placement.

It is noted that at least some exemplary embodiments include algorithms that are based upon statistical analysis of words that a recipient may have difficulty understanding when utilizing a given hearing prosthesis at issue. By way of example only and not by way of limitation, a statistical database can be created or otherwise obtained with respect to words that are often difficult to understand by people in general that utilize a cochlear implant or, more specifically, with respect to the given recipient participating in the method or otherwise utilizing the systems detailed herein.

By way of example only and not by way of limitation, the analysis executed by the system of speech of a conversation can include the identification of certain words, which words will trigger an indicator and/or a set of instructions, such as speak slower, annunciate more clearly, do not speak with food in mouth or with a cup in front of your face (which could be based on an analysis of different portions of the speech, such as a reverberation indicative of sound waves resulting from speech impacting on glass or on a fluid, such as a fluid in a cup—note also that in at least some exemplary embodiments, the system is configured to utilize visual images that can assess actions of a speaker, which visual images can be automatically analyzed to determine that the speaker is making movements or otherwise is positioning himself or herself in a manner that is less than utilitarian with respect to the hearing prostheses capturing sound), etc.

It is noted that in some embodiments, the system can be configured to instruct someone to stop talking, whether that be the recipient or a person that is party to the conversation. Still further, in an exemplary embodiment, the system can be configured to instruct one or more parties to the conversation, whoever that may be, to notify someone else that they should stop talking, which someone else is not part of the conversation.

Note also that in some exemplary embodiments, the indications provided by the system can simply be an indication to the recipient and/or to another party to the conversation of what is going on in the ambient sound environment. By way of example only and not by way of limitation, the system can be configured to analyze the sound and indicate to the recipient certain features of the sounds, such as there exists a medium level of background noise, the person speaking to you is speaking clearly, there exists a wind noise, there exists low-level background machine noise (central air fan), etc. Note also that the system can provide both the indication as to the environment as well as an instruction.

Any type of indication to one or more parties of the conversation can be utilized in at least some exemplary embodiments. In an exemplary embodiment, haptic feedback is provided. In an exemplary embodiment, audio indicators are provided. While the embodiments detailed above have been directed towards an audio indicator that is provided only by the prosthesis and which can only be heard by the recipient thereof, in some alternate embodiments, the audio indicator can be heard by all parties or the audio indicator can only be heard by one or more parties to the conversation that do not have the prostheses.

To be clear, in at least some exemplary embodiments, some or all of the methods, systems, and devices herein, in part or in whole, are completely entirely conversation based. By way of example only and not by way of limitation, any one or more or all of the method actions associated with the methods detailed herein can be entirely conversation based. That is, the evaluations/the analyses and the instructions are based entirely on a conversation, and nothing more (in some embodiments).

It is noted that the disclosure herein includes analyses being executed by certain devices and/or systems. It is noted that any disclosure herein of an analysis also corresponds to a disclosure of an embodiment where an action is executed based on an analysis executed by another device. By way of example only and not by way of limitation, any disclosure herein of a device that analyzes a certain feature and then reacts based on the analysis also corresponds to a device that receives input from a device that has performed the analysis, where the device acts on the input. Also, the reverse is true. Any disclosure herein of a device that acts based on input also corresponds to a device that can analyze data and act on that analysis.

It is noted that any disclosure herein of instructions also corresponds to a disclosure of an embodiment that replaces the word instructions with information, and vice versa.

It is noted that any disclosure herein of an alternate arrangement and/or an alternate action corresponds to a disclosure of the combined original arrangement/original action with the alternate arrangement/alternate action.

It is noted that any method action detailed herein also corresponds to a disclosure of a device and/or system configured to execute one or more or all of the method actions associated there with detailed herein. In an exemplary embodiment, this device and/or system is configured to execute one or more or all of the method actions in an automated fashion. That said, in an alternate embodiment, the device and/or system is configured to execute one or more or all of the method actions after being prompted by a human being. It is further noted that any disclosure of a device and/or system detailed herein corresponds to a method of making and/or using that the device and/or system, including a method of using that device according to the functionality detailed herein.

It is noted that embodiments include non-transitory computer-readable media having recorded thereon, a computer program for executing one or more or any of the method actions detailed herein. Indeed, in an exemplary embodiment, there is a non-transitory computer-readable media having recorded thereon, a computer program for executing at least a portion of any method action detailed herein.

In an exemplary embodiment, there is a method, comprising engaging, by a hearing impaired person, in a conversation, utilizing a first electronics device to capture at least a portion of the sound of the conversation at a point in time, analyzing, using the first electronics device and/or a second electronics device, the captured sound, and artificially providing, during the conversation, information to a party to the conversation related to the captured sound based on the analysis to enhance an aspect of the conversation at a subsequent point in time. In an exemplary embodiment, there is a method as described above and/or below, wherein the action of artificially providing information includes automatically providing a visual indication to the party utilizing a device remote from the party upon a certain result of the analyzing. In an exemplary embodiment, there is a method as described above and/or below, wherein the action of artificially providing information includes providing a visual indication to the party utilizing a device worn and/or held by the party. In an exemplary embodiment, there is a method as described above and/or below, wherein the first electronics device is a portable smart device, and the action of analyzing and the action of providing are executed by the first electronics device.

In an exemplary embodiment, there is a method as described above and/or below, wherein the information is information specific to non-conversation related sounds. In an exemplary embodiment, there is a method as described above and/or below, wherein the first electronics device is a hearing prosthesis worn by the hearing impaired person, the action of analyzing the captured sound is executed using the second electronics device, wherein the second electronics device is a portable smart device, the first electronics device provides a wireless signal to the second electronics device based on the captured sound, and the second electronics device analyses the signal in the action of analyzing and the action of artificially providing information to the party to the conversation includes utilizing the second electronics device.

In an exemplary embodiment, there is a method as described above and/or below, wherein the first electronics device is a hearing prosthesis worn by the hearing impaired person, the action of analyzing the captured sound is executed using a second electronics device, and the second electronics device and/or the first electronics device provides a wireless signal to a third electronics device instructing the third electronics device to execute the action of artificially providing information to the party to the conversation. In an exemplary embodiment, there is a method as described above and/or below, wherein the first electronics device is a hearing prosthesis worn by the hearing impaired person, the action of analyzing the captured sound is executed using the first electronics device, the action of artificially providing information to the party to the conversation is executed by the first electronics device, and the party to the conversation is a person other than the recipient of the hearing prosthesis.

In an exemplary embodiment, there is a method of managing a conversation, comprising utilizing a portable electronics device, electronically analyzing sound captured during the conversation, and based on the analysis, artificially providing an indicator to a participant in the conversation related to how the participant is speaking to improve the conversation, wherein at least one participant the conversation is using a hearing prosthesis to hear. In an exemplary embodiment, there is a method as described above and/or below, further comprising the action of announcing, by the participant using the hearing prosthesis, to another participant of the conversation that the indicator may be provided and explaining by the participant using the hearing prosthesis, to the another participant of the conversation, what the indicator means. In an exemplary embodiment, there is a method as described above and/or below, wherein the action of artificially providing the indicator includes providing a visual indicator by the portable device; and the visual indicator is a first light that indicates that a participant is speaking in an unsatisfactory manner.

In an exemplary embodiment, there is a method as described above and/or below, further comprising the action of subsequent to providing the first light, capturing and analyzing sound captured during the conversation and providing a visual indicator in the form of a second, different type of light that indicates that a participant is speaking in a satisfactory manner. In an exemplary embodiment, there is a method as described above and/or below, further comprising utilizing the portable electronic device, electronically analyzing sound captured during the conversation a second time, and based on the second analysis, artificially providing a second, subsequent, indicator to a participant in the conversation that a participant is speaking differently. In an exemplary embodiment, there is a method as described above and/or below, wherein the indicator is an indicator that the participant can speak differently to improve the conversation. In an exemplary embodiment, there is a method as described above and/or below, further comprising, based on the analysis and/or a subsequent analysis of subsequently captured sound, artificially providing an indicator to a participant in the conversation that there exists a phenomenon separate from speech of the participants that is deleterious to the conversation In an exemplary embodiment, there is a method as described above and/or below, wherein the indicator to a participant in the conversation that there exists a phenomenon that is deleterious to the conversation is an indicator of one or more of an ambient noise or a deficient microphone placement.

It is further noted that any disclosure of a device and/or system detailed herein also corresponds to a disclosure of otherwise providing that device and/or system.

It is further noted that any element of any embodiment detailed herein can be combined with any other element of any embodiment detailed herein unless stated so providing that the art enables such. It is also noted that in at least some exemplary embodiments, any one or more of the elements of the embodiments detailed herein can be explicitly excluded in an exemplary embodiment. That is, in at least some exemplary embodiments, there are embodiments that explicitly do not have one or more of the elements detailed herein.

While various embodiments of the present invention have been described above, it should be understood that they have been presented by way of example only, and not limitation. It will be apparent to persons skilled in the relevant art that various changes in form and detail can be made therein without departing from the spirit and scope of the invention.

What is claimed is:

1. A system, comprising:

a signal input;

a processor; and a signal output, wherein the processor is configured to generate an instruction related to data related to a user of an electronics device based on input into the signal input, and the signal output is configured to output data indicative of the instruction.

2. The system of claim 1, wherein:

the electronics device is a sensory prosthesis;

the user is a recipient of the sensory prosthesis; and the processor is configured to analyze the data related to the recipient and determine whether a person speaking is providing sensory input in a manner that enhances a sensory percept of the recipient of the sensory prosthesis.

3. The system of claim 2, wherein:

the system is configured to identify whether the person speaking is a person with the sensory prosthesis.

4. The system of claim 3, wherein:

the system is configured to provide the instruction to the recipient of the sensory prosthesis.

5. The system of claim 3, wherein:

the system is configured to provide the instruction to a person that is part of a group of people providing sensory input captured by the system other than the recipient of the sensory prosthesis.

6. The system of claim 1, wherein:

the signal input is in signal communication with a microphone.

7. The system of claim 1, wherein:

the system is configured to evoke at least one of a visual, an audible or a tactile indication as the output indicative of an instruction.

8. The system of claim 1, wherein:

the system includes a hearing prosthesis and a smart device, the smart device including an interactive display screen remote from the hearing prosthesis; and the system is configured to display, on the interactive display screen, one or more controls of the hearing prosthesis.

9. A device, comprising:

a prosthesis configured to operate with a sensory evoking phenomenon capture device that also includes an indicator, wherein the prosthesis is configured to provide input to the device related to a captured sensory stimulation evoking phenomenon captured by the prosthesis and/or the device so that the device provides an indication related to the phenomenon via the indicator.

10. The device of claim 9, wherein:
the prosthesis is a hearing prosthesis; and
the sensory evoking phenomenon capture device is a microphone.

11. The device of claim 9, wherein:
the indicator is a visual indicator, and the indication provided by the indicator is a visual indication.

12. The device of claim 9, wherein:
the indicator is configured to provide an indication regarding the captured sensory stimulating phenomenon to enhance a future sensory input from a future sensory stimulating phenomenon.

13. The device of claim 9, wherein:
the indication is an indication that there exists a phenomenon that is deleterious to a future sensory input from a future sensory stimulating phenomenon.

14. The device of claim 9, wherein:
the prosthesis is configured to analyze the captured phenomenon and develop the input to the sensory evoking phenomenon capture device, wherein the input is input instructing the indicator to indicate that one or more people within visual sight of the indicator should take an action that impacts a future sensory input from a future sensory stimulating phenomenon.

15. The device of claim 9, wherein:
the prosthesis is configured to adjust a functionality of the sensory evoking phenomenon capture device unrelated to the indicator.

16. The device of claim 9, wherein:
the prosthesis is configured to automatically determine that it is paired with the sensory evoking phenomenon capture device and begin providing the input to the device due to the determination.

17. The device of claim 9, wherein:
the sensory evoking phenomenon capture device is a separate device from the prosthesis and/or a remote device from the prosthesis.

18. A non-transitory computer-readable media having recorded thereon, a computer program for executing the following actions:
processing captured sensory input to identify an indication for one or more persons in an interaction, at least one of the one or persons being a person using a sensory prosthesis, to enable the person using the sensory prosthesis to have at least one of an enhanced or an adequate sense of a future sensory input; and
outputting the indication for the one or more of the persons.

19. The non-transitory computer-readable media of claim 18, wherein:
the indication is an instruction to a participant in the conversation other than the person using the hearing prosthesis.

20. The non-transitory computer-readable media of claim 18, wherein:
the indication is non-instruction information.

21. The non-transitory computer-readable media of claim 18, wherein:
the indication indicates that one or more of the participants is speaking properly.

22. The non-transitory computer-readable media of claim 18, wherein:
the indication is an instruction to one or more of the participants to speak differently.

23. The non-transitory computer-readable media of claim 18, wherein:
the indication indicates that one or more features in an ambient environment is deleterious to an optimum sensory percept by the person using the sensory prosthesis.

24. The non-transitory computer-readable media of claim 18, wherein:
the sensory prosthesis is a hearing prosthesis; and
the indication is an indication that a sensitivity of a sound capture apparatus remote from the hearing prosthesis can be adjusted and/or that at another sound capture apparatus can be used to improve hearing by the person using the hearing prosthesis.

25. The device of claim 9, wherein:
the sensory evoking phenomenon capture device is a separate device from the prosthesis.

26. The device of claim 9, wherein:
the sensory evoking phenomenon capture device is a remote device from the prosthesis.

27. The device of claim 9, wherein:
the prosthesis is configured to also provide input to the device that corresponds to the captured sensory stimulation evoking phenomenon, wherein the input to the device related to the captured sensory stimulation evoking phenomenon is different from the input to the device that corresponds to the captured sensory stimulation evoking phenomenon.

28. The device of claim 9, wherein:
wherein the captured sensory stimulation evoking phenomenon is captured by the device.

29. The system of claim 1, wherein the system is further configured to, in addition to generating the instruction and outputting data indicative of the instruction, receive input control commands, from a party to a conversation of which the user is a part, into the system and adjust a setting of the system based on the command.

30. The device of claim 9, wherein:
the device is further configured to, in addition to providing an indication related to the phenomenon via the indicator, receive input control commands, from a party to a conversation of which a user of the device is a part, into the device, and adjust a setting of the device based on the command.

* * * * *